(12) United States Patent
Dunning et al.

(10) Patent No.: US 11,780,610 B2
(45) Date of Patent: Oct. 10, 2023

(54) MONITORING OF A REVOLVING COMPONENT EMPLOYING TIME-SYNCHRONIZED MULTIPLE DETECTORS

(71) Applicant: GE AVIATION SYSTEMS LIMITED, Gloucestershire (GB)

(72) Inventors: Paul Dunning, Eastleigh (GB); Nicholas Keningley, Eastleigh (GB); Steven Bonnett, Eastleigh (GB); Timothy North, Eastleigh (GB); Matthew William Wiseman, Fairfield, OH (US)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 165 days.

(21) Appl. No.: 16/677,631

(22) Filed: Nov. 7, 2019

(65) Prior Publication Data
US 2021/0139167 A1    May 13, 2021

(51) Int. Cl.
*G07C 5/02* (2006.01)
*G01H 1/00* (2006.01)
(Continued)

(52) U.S. Cl.
CPC .............. *B64F 5/60* (2017.01); *G01H 1/003* (2013.01); *G01M 13/028* (2013.01); *G07C 5/02* (2013.01)

(58) Field of Classification Search
CPC . B64F 5/60; G01H 1/003; G01H 1/04; G01H 1/10; G01H 1/12; G01H 3/08; G01H 3/06;
(Continued)

(56) References Cited

U.S. PATENT DOCUMENTS 5,698,788 A * 12/1997 Mol .................. G01H 3/08
702/56
6,016,994 A    1/2000 Maino
(Continued)

FOREIGN PATENT DOCUMENTS

EP    0889313    1/1999
EP    0899553    3/1999
(Continued)

OTHER PUBLICATIONS

Extended European Search Report from EP Appl. No. 20200258.0, dated Mar. 24, 2021.

*Primary Examiner* — Manuel A Rivera Vargas
(74) *Attorney, Agent, or Firm* — Enang Akan; Darrow Mustafa PC

(57) ABSTRACT

A system and method for acquiring accurate vibration data, time of arrival, or other mechanical state for a mechanical system with rotary elements, such as a planetary gear system with multiple planet gears that rotate relative to a central sun gear, or blades in a turbine engine. Multiple vibration sensors are arranged at spaced intervals along the exterior of the gear system (such as along the ring gear of the system or the exterior housing of the system). Each vibration sensor is so situated as to periodically detect vibrations from each one of the planet gears in succession, as the planet gears rotate around the central sun gear. Using timing and gear-system configuration information, a determination is made as to which gear is being sensed by any one sensor at any time; also determined is which teeth of each gear are being sensed by a particular sensor at any one time. The system and method consolidates the vibration data from multiple sensors to determine a consolidated vibration profile for each planet gear.

20 Claims, 12 Drawing Sheets

(51) Int. Cl.
*B64F 5/60* (2017.01)
*G01M 13/028* (2019.01)

(58) Field of Classification Search
CPC ....... G01H 1/006; G01H 3/00; G01M 13/028; G01M 13/021; G01M 13/02; G07C 5/02
See application file for complete search history.

(56) References Cited

U.S. PATENT DOCUMENTS

| | | | | |
|---|---|---|---|---|
| 6,298,725 | B1 * | 10/2001 | Forrester | G01N 29/449 |
| | | | | 73/593 |
| 6,681,634 | B2 * | 1/2004 | Sabini | G01N 29/449 |
| | | | | 73/660 |
| 6,832,973 | B1 * | 12/2004 | Welsh | F16H 57/0006 |
| | | | | 381/71.4 |
| 6,898,975 | B2 * | 5/2005 | Blunt | G01H 1/003 |
| | | | | 73/593 |
| 7,689,385 | B2 | 3/2010 | Shen | |
| 7,987,725 | B2 | 8/2011 | Twerdochlib | |
| 8,219,361 | B2 | 7/2012 | Leigh | |
| 8,393,993 | B2 * | 3/2013 | Demtroeder | F03D 17/00 |
| | | | | 702/56 |
| 8,777,800 | B2 | 7/2014 | Morel | |
| 9,068,880 | B2 | 6/2015 | Acharya et al. | |
| 9,678,129 | B2 * | 6/2017 | Hassel | G01R 31/58 |
| 10,168,248 | B1 | 1/2019 | Morey et al. | |
| 10,240,662 | B2 * | 3/2019 | Thomassey | F16H 1/12 |
| 10,309,516 | B2 * | 6/2019 | Camminadi | F03D 17/00 |
| 2011/0230304 | A1 * | 9/2011 | Morel | G01M 13/028 |
| | | | | 475/331 |
| 2011/0259093 | A1 * | 10/2011 | Gerez | G01H 13/00 |
| | | | | 73/112.01 |
| 2012/0029838 | A1 * | 2/2012 | Hallman | F03D 15/00 |
| | | | | 702/34 |
| 2013/0305827 | A1 * | 11/2013 | Kessler | G01H 9/004 |
| | | | | 73/649 |
| 2015/0369699 | A1 * | 12/2015 | Chen | G01M 13/028 |
| | | | | 73/593 |
| 2016/0163133 | A1 * | 6/2016 | Ricci | G06F 16/951 |
| | | | | 701/33.4 |
| 2019/0033171 | A1 * | 1/2019 | Zhang | F02D 41/22 |
| 2019/0078974 | A1 * | 3/2019 | Nowoisky | G01M 13/021 |
| 2020/0123985 | A1 | 4/2020 | Lück | |

FOREIGN PATENT DOCUMENTS

| | | | | |
|---|---|---|---|---|
| EP | | 2366989 | 9/2011 | |
| WO | | 2018/193049 A1 | 10/2018 | |
| WO | WO-2018193049 A1 * | | 10/2018 | ............... F02C 7/36 |
| WO | WO-2019042577 A1 * | | 3/2019 | ............ F16H 57/01 |

* cited by examiner

Method for Gear-and-Teeth-Specific Vibration Sensing With Multiple Vibration Sensors

MONITORING OF A REVOLVING COMPONENT EMPLOYING TIME-SYNCHRONIZED MULTIPLE DETECTORS

I. FIELD OF THE INVENTION

The present invention relates to assessing system performance for revolving mechanical components of a kind employed in rotary systems, such as transport systems. More particularly, the present invention relates to monitoring vibrations in complex gear systems such as for example planetary gear systems, or rotating turbine blades.

II. BACKGROUND OF THE INVENTION

Vehicular Sensors and Sensing Systems: Modern transport vehicles (hereinafter, "vehicles") include helicopters, airplanes, cars, trucks, boats and trains. It is common for vehicles to include electronic sensors to monitor both the performance and the environment of a vehicle. In a vehicle, one or more accelerometer sensors may record data indicative of the performance or the behaviour of mechanical systems or electromechanical systems, such as engines or transmissions.

The data obtained via vehicle sensors may be used for multiple purposes. For example, a sensor may monitor real-time performance of a vehicle component to ensure a component is operating within safe or appropriate parameters (for example, for heat, pressure, electrical performance, and similar). Where variations from expected performance ranges are detected by a sensor, a hardware processor with suitable code may be used to adjust operations of the vehicle to correct for problems. Another use of collected sensor data is for after-the-fact analysis of vehicle performance. After-the-fact analysis may help with the development of vehicle prototypes during a vehicle design process. In other cases such data, when analyzed over time, may provide early-alert warnings to potential or pending problems for the vehicle already in field use.

Data Acquisition and Processing Units: A vehicle's sensing/monitoring system (VSMS) is formed of one or more unique maintenance and/or safety systems that are already fitted to many vehicles, including in particular but not limited to aircraft, such as airplanes and helicopters. These maintenance and/or safety systems will typically entail the use of multiple Data Acquisition and Processing Units (DAPUs), which each collect and process data from various sensors. Exemplary DAPUs may include, for example and without limitation: Crash-Survivable Cockpit Voice & Flight Data Recorders (CVFDR); On-board Maintenance Systems (OMS); Engine Monitoring Units (EMU); and Health & Usage Monitoring/Management Systems (HUMS).

For example, a health and usage monitoring system (HUMS) is fitted to machinery primarily in order to give advanced warning of impending failures. In helicopter applications of a HUMS, these systems perform data acquisition, processing, storage and transmission, drawing their data from dedicated sensors (such as accelerometers).

Vibration Monitoring and Gear Systems: Typical DAPU functions, such as HUMS functions, include vibration health monitoring (VHM) of portions of a helicopter. Vibration sensors may be employed to monitor the amount of vibration in gear systems throughout the vehicle. These vibration sensors, in conjunction with suitable DAPUs, can determine whether or not the vibration signature remains within designated limits, which may be determined by engineers during system design or which may be user configurable via software. The limits may be designated with respect to, or out of concern for, gear/drivetrain safety issues, performance assessment, indications of wear-and-tear, and many other factors.

Vibration signatures may include for example and without limitation: vibration amplitude, vibration frequency, time variations of frequency or amplitude, averages of amplitude or frequency, frequency bandwidth, and any number of other parameters of the raw sensor vibration signal, or characteristics derived from the raw signal.

Because gears turn, it is generally not practical or even possible to mount vibration sensors on the rotating gears themselves. Instead, vibration sensors are typically mounted on a housing which contains the gears. A vibration sensor can detect vibrations of fixed-location (fixed relative to the sensor), nearby gears within the housing. However, such monitoring yields only indirect recording of the vibrations of the actual gears themselves.

Epicyclic Gear Monitoring: Further, some gear systems, referred to equivalently in this document as "planetary gear systems" and "epicyclic gear systems", involve multiple gears which are engaged in two movements: the first movement is a turning around its own center point by each gear of several planetary gears; the second movement is a spatial rotation/revolving of the several planetary gears around a common central axis.

Due to this revolving of the gears, individual gears move cyclically in- and out-of range of a fixed vibration sensor on the gear system housing. Planetary gear systems therefore pose additional challenges for accurately identifying/isolating the vibrations which may be due to a specific gear among the multiple gears. As opposed to other gears which may be fixed in place in a drivetrain, the position of the planetary gears relative to a fixed sensing location varies greatly during normal operation. Planet gears can only be monitored when they are known to be within range of the sensor.

In conventional sensing systems for planetary gear systems, then, a complete picture of gear health must be built-up by sensing gear vibrations over multiple revolutions over time. This generally results in a time-imprecise or "fuzzy" reconstruction of gear vibrations. Due to the number of samples required and the nature of the planetary gearbox, a time-averaged vibration signal can take tens-of-minutes to acquire. Further, to ensure that samples which are time-averaged are comparable samples, the samples are only acquired in the same or comparable "regimes" (for example, signals obtained during the same or similar flight conditions). This further limits the opportunity to collect averaged signals.

III. SUMMARY OF EMBODIMENTS OF THE INVENTION

Given the aforementioned deficiencies, what is needed is an improved system and method for monitoring complex gear systems such as planetary gear systems where the positions of some gears are not fixed over time. An improved monitoring system for planetary gears also has applications for other types of rotary mechanical systems.

In an embodiment, the present system and method employs multiple vibration sensing points on the outside of the gearbox/housing. The method then aggregates the vibration signals relating to the same gear (or gear bearing) from the multiple sensors. In an epicyclic gearbox this allows the planet gears to be "tracked' by the multiple vibration sensors through their rotation around the central shaft axis.

This present system and method provides benefits for the speed in which a complete scan of the gear can be completed. This system and method also increases the number of samples to reduce the influence of noise in the signal average, and provides a consistent load path for the transmission of planet bearing vibration. It will be noted that the sun gear is also monitored, if only indirectly, via monitoring of the planet gears and ring gears; the present system and method benefits from providing a consistent load path for the monitoring of the sun gear (since the sun gear is monitored via sensors at different angles in relation to the central axis of the sun gear).

Other specific implementation details and benefits of the present system and method, as well as other embodiments and additional applications, will be apparent to persons skilled in the art from the detailed description and drawings which follow, and also from the appended claims.

IV. BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings. The drawings, which are incorporated herein and form part of the specification, illustrate the present invention and, together with the description, further serve to explain the principles of the invention and to enable a person skilled in the relevant art(s) to make and use the invention.

V. DETAILED DESCRIPTION OF EMBODIMENTS OF THE INVENTION

While the present invention is described herein with illustrative embodiments for particular applications, it should be understood that the invention is not limited thereto.

The following detailed description is merely exemplary in nature and is not intended to limit the system and methods, the elements or steps of the system and method, its applications, and its uses disclosed herein. Further, there is no intention for the scope to be bound or limited to or by any theory presented in the preceding background or summary, nor in the following detailed description. Those skilled in the art with access to the teachings provided herein will recognize additional modifications, applications, and embodiments within the scope thereof and additional fields in which the invention would be of significant utility.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Headings used in this detailed description are present only to assist in making this document readable and easy to navigate, and should not be construed as defining or limiting.

The system and method is not limited to the embodiments described below, which are exemplary only. Rather, the full scope of the system and method is recited in the claims which follow. It will be further understood that the appended claims are themselves disclosure, and the full scope of the system and method may include elements which are recited in the claims only.

Vehicle and Sensors

Figure 1:
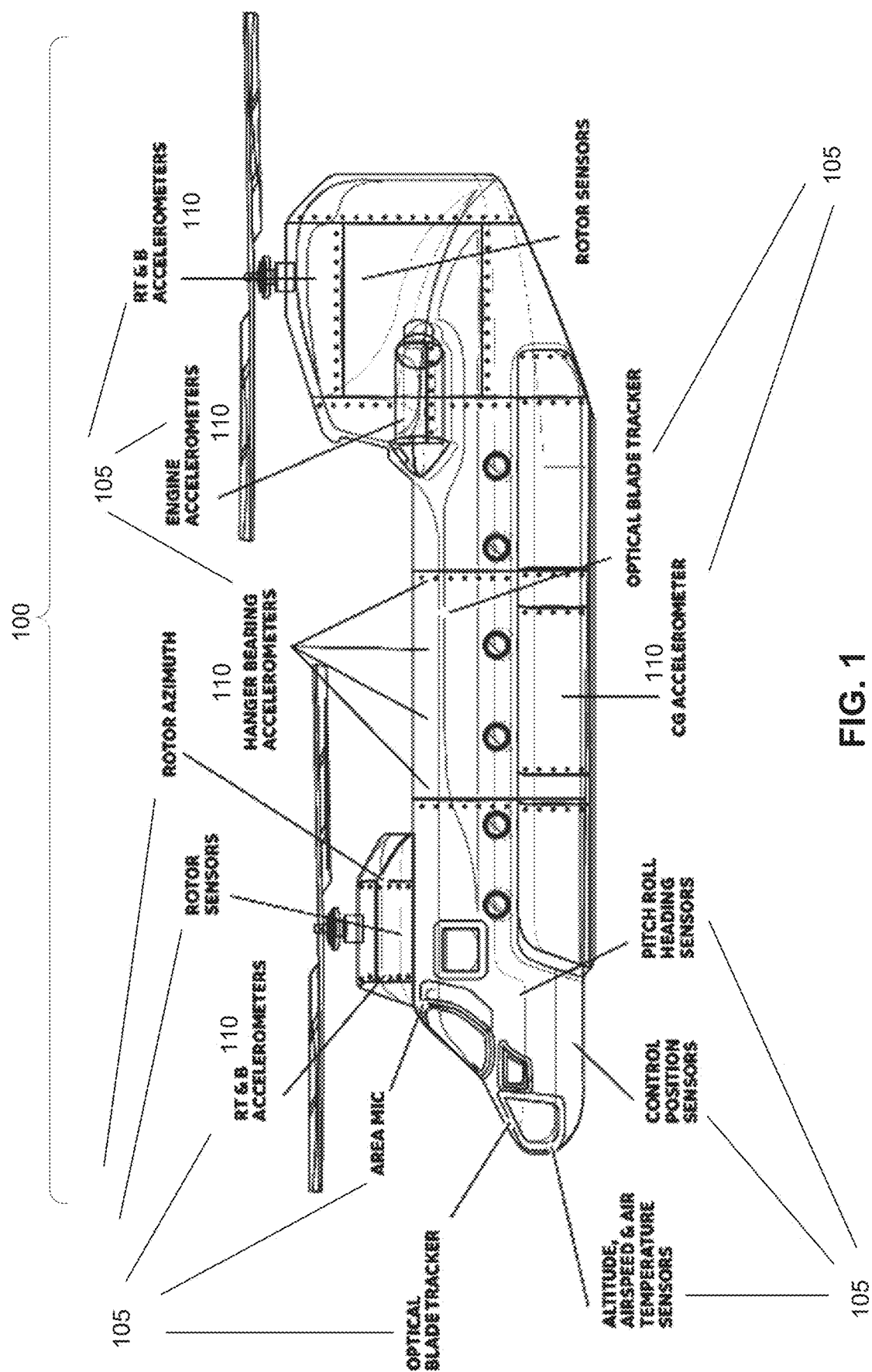
FIG. 1 illustrates an exemplary vehicular transport system with sensors.

FIG. 1 illustrates an exemplary vehicular transport system ("vehicle") 100, in this instance an exemplary helicopter 100. The use of a helicopter is for purposes of illustration only, and should not be construed as limiting. Numerous elements of transport vehicles in general, including airplanes, cars, trucks, ships, and in particular helicopters, are well known in the art and will not be described here.

The vehicle 100 may include a sensor or a multitude of sensors 105, typically of different types. The sensors 105 may have elements which are electrical, mechanical, optical, and/or chemical, and may sense various environmental or vehicle phenomena or energies. The sensors 105 operate in real-time to provide a time-series view of the magnitude or intensity of the phenomena they sense, the real-time data being provided as output as either raw electrical signals with varying voltages and currents, or as digital/numeric sampled data.

Exemplary placements within or along the vehicle 100 of numerous exemplary sensors 105 are shown in the FIG. 1, such as those for altitude, vehicular speed, vehicular direction and orientation, temperatures, pressures, location, vehicular acceleration, and others.

Mechanical State/Property Sensors: Included among the sensors 105 may be mechanical state/property (MSP) sensors 110, such as vibration sensors 110 that are also referred to as accelerometers 110. (Persons skilled in the art will appreciate that, as used herein, the term "accelerometer" is employed equivalently to "vibration sensors", as opposed to the types of acceleration detectors which may be employed to detect gross acceleration of the entire vehicle 100.) Vibration sensors 110 may detect vibration frequencies, vibration magnitudes, or waveforms which reflect vibration frequency and magnitude. In alternative embodiments of the present system and method, mechanical state sensors 110 may include other types of mechanical sensors as well, such a time-of-arrival sensors 1110 for engine blades 1115 (see FIG. 11 below).

In one embodiment of the present system and method, traditional vibration sensors 110 (such as piezo-electric sensors) may be employed. In an alternative embodiment, MEMS (micro-electrical mechanical systems) vibration sensors 110 may be utilized. Other vibration sensors 110 may be employed as well.

Figure 2:
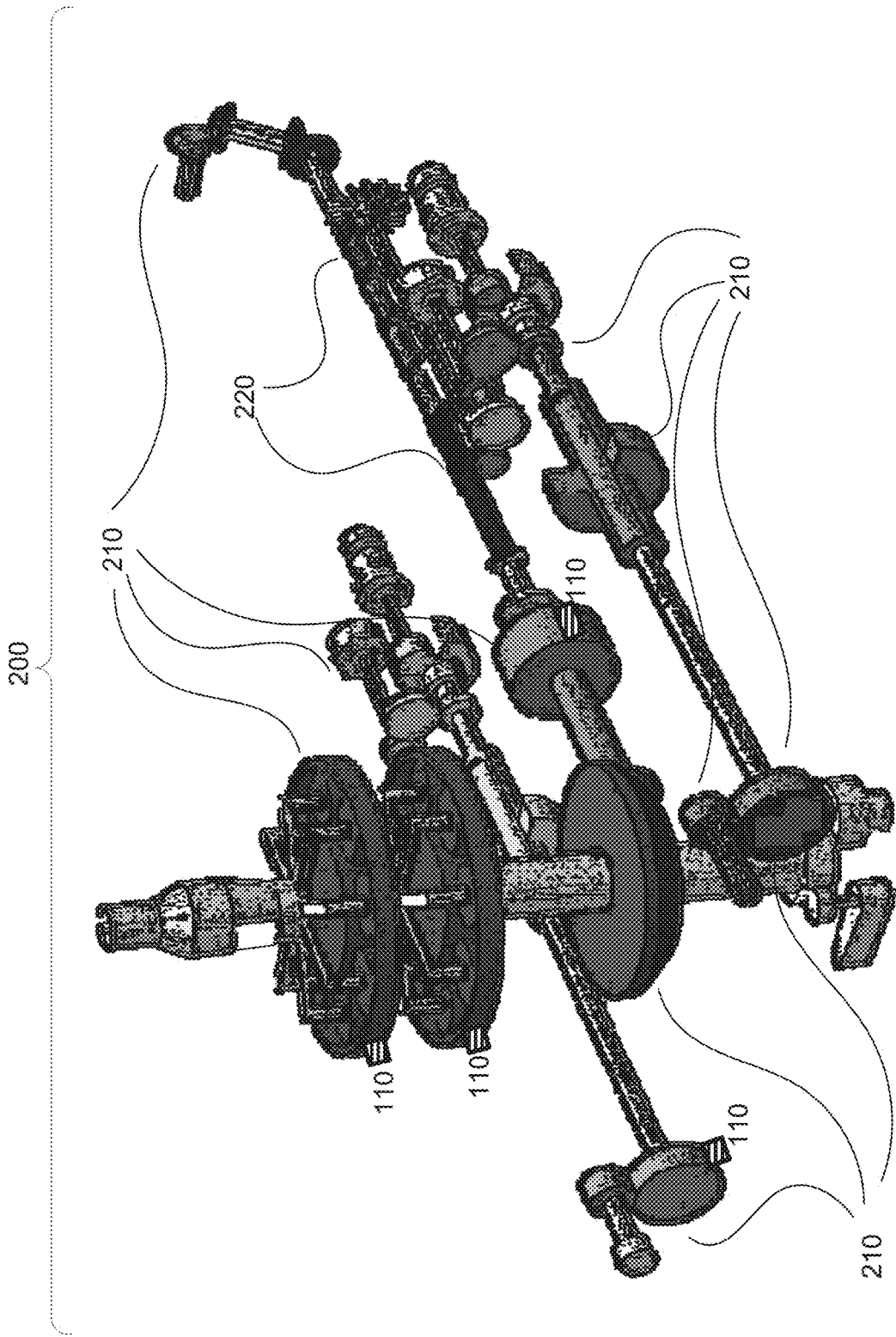
FIG. 2 illustrates an exemplary internal mechanical element with rotary components in a transport vehicle with mechanical element sensors.

FIG. 2 illustrates an exemplary, complex internal mechanical element 200 of the vehicle 100, in this case an exemplary helicopter drive train 200 or gear system 200. However, the present system and method is not limited to helicopter drivetrains, and may be applicable in the context of many vehicular components and other systems with mechanical components.

The gear system 200 is internal to helicopter 100 (and so not shown in the view of FIG. 1), and includes gears, drive shafts and other elements which may be used to transfer power from the helicopter engine (not shown) to the helicopters rotors (not shown) and other elements within the helicopter (such as generators). Gears are typically enclosed within enclosures or casings known as gearboxes 210. Drive shafts may also have shaft enclosures 220. The vibration sensors 110 or other mechanical state sensors 110 associated with the drive drain 200 may be located externally to the gear boxes 210 and shaft enclosures 220; the vibration sensors 110 are thereby suitably situated to detect gear vibrations 537 (see FIG. 5 below) at numerous gearboxes 210 along the drive train 200.

In the figure only a few vibration sensors 110 are illustrated. As will be understood by persons skilled in the relevant arts, placements of vibration sensors 110 may be made at any gearbox among multiple gearboxes 210 within the drive train or within/associated-with other mechanical elements (for example, along or within the engine).

Shown in the figure is one vibration sensor 110 only associated with each single gearbox 210. Embodiments of the present system and method employ multiple vibration sensors 110 associated with a single gear box 210.

Exemplary Vehicle Sensing/Monitoring System According to Present Art

Figure 3:
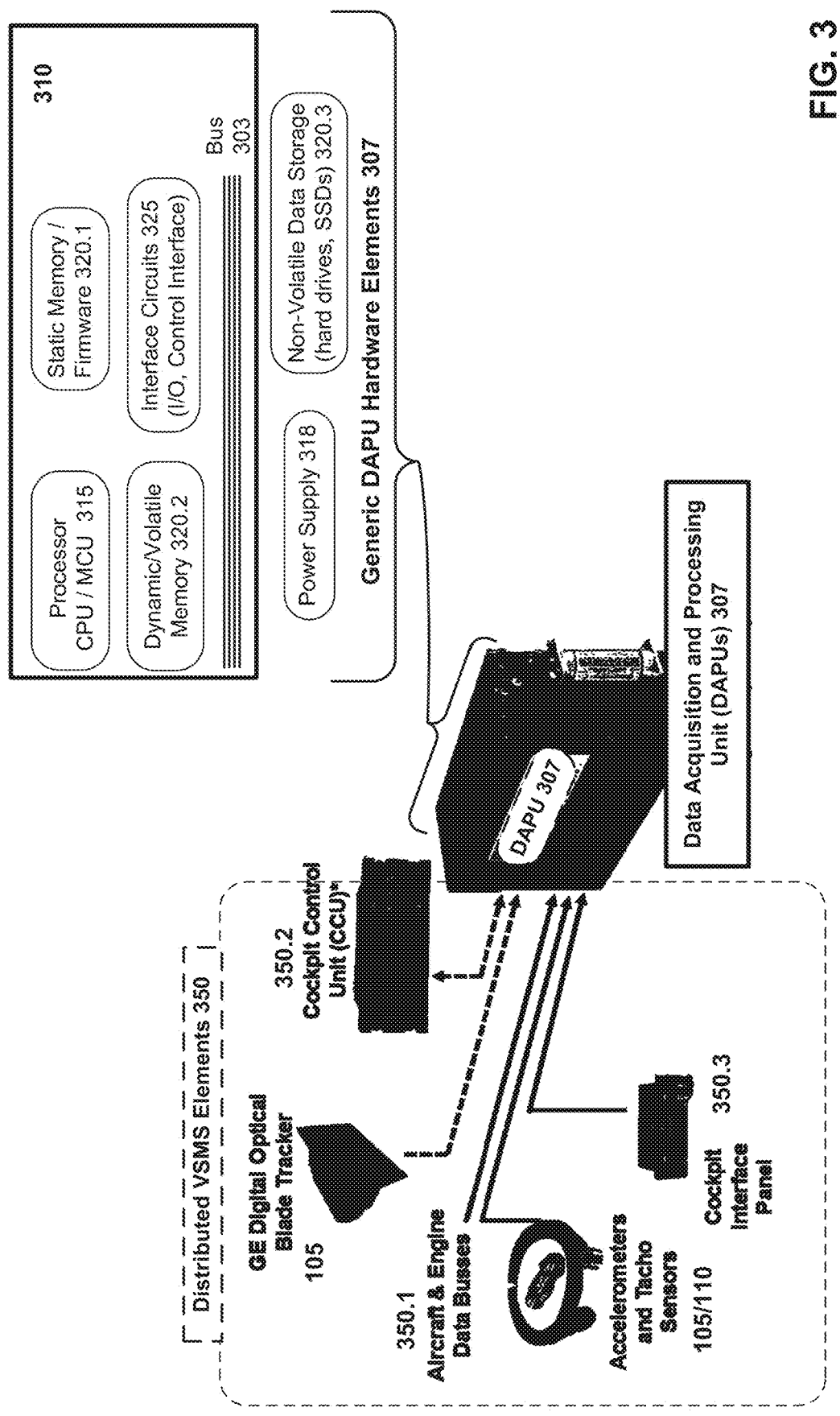
FIG. 3 illustrates an exemplary architecture for a Vehicle Sensing/Monitoring System (VSMS).

FIG. 3 illustrates an exemplary architecture for a Vehicle Sensing/Monitoring System (VSMS) 300, and which may be associated with a transport vehicle 100 such as exemplary helicopter 100. The terms "vehicle monitoring system", "vehicle sensing system", "vehicle sensing/monitoring system (VSMS)" and "VSMS" are used interchangeably and with the same meaning below in this document. The VSMS 300 may include, for example and without limitation:

(1) Multiple Data Acquisition and Processing Units (DAPU) 307, which may for include for example and without limitation: a Crash-Survivable Cockpit Voice & Flight Data Recorder (CVFDR) 307 an On-board Maintenance Systems (OMS) 307, Quick Access Recorders (QAR) 307, and a Health & Usage Monitoring/Management Systems (HUMS) 307. The DAPU(s) 307 support the recording of vehicular sensor data, the processing and analysis of that sensor data, storage of both raw and analyzed sensor data, and distribution of the raw/analyzed/stored data to aircraft display and control elements, and to off-vehicle computers. The DAPU(s) 307 function as the real-time processing and data storage cores of the VSMS 300; and (2) One or more Vehicular Distributed VSMS Elements 350, which may include a variety of sensors 105/110 distributed throughout the vehicle 100, including mechanical state sensors (MSP) 110, as well as other elements 350.*n*.

Both of these are discussed further immediately below.

Data Acquisition and Processing Unit (DAPU)

As illustrated schematically in the callout in FIG. 3, and in one exemplary embodiment, a DAPU 307 may include, for example and without limitation:

(a) A circuit card assembly (CCA) 310, which may also be known in the art as a motherboard 310, which typically holds and interconnects various microchips, including for example microchips 315/320/325 discussed immediately below (paragraphs (b), (c), (d), and (e)), and also bus 303 (paragraph (f)). In some embodiments, the CCA 310 may also hold or mount either or both of power supply 318 (paragraph (h)) and/or data storage 320.3 (paragraph (g)).

(b) One or more hardware processor 315(*s*), also known as a central processing unit (CPU) 315 or microcontroller unit (MCU) 315, which provides for overall operational control of the DAPU 307. This includes but is not limited to receiving data from sensors 105, and possibly modifying some operations of sensors 105 via various application specific integrated circuits (ASICs) 325. The MCU 315 may also be programmable or hard-coded to support the processing and analysis functions of the present system and method.

(c) Volatile memory 320.2, such as dynamic RAM (DRAM), may be used to temporarily store data received from the sensors 105. Volatile memory 320.2 may also be used to temporarily store some or all of the code from static memory 320.1, and also for temporarily storing processed sensor data which is generated by the hardware processor 315 based on the data received from sensors 105.

(d) Static memory or firmware 320.1 for storing non-volatile operational code, including but not limited to operating system code, computer code for locally processing and analyzing data from sensors 105, and computer code which may be used specifically to enable the DAPU 307 to implement the methods described in this document and other methods within the scope of the appended claims. In particular the CPU 315 may employ the code stored in the static memory 320.1 to implement the methods described in this document and other methods within the scope of the appended claims.

(e) Interface circuits 325 may perform a variety of tasks, including data and control exchanges with sensors 105, as well as input/output (I/O) tasks, network connection operations, control of the bus 303, and other tasks generally known in the art of processing systems. Interface circuits 325 may also control or interface with non-volatile data storage 320.3.

Interface circuits 325 may also support such functions as external input/output (for example, via USB ports, an Ethernet port, or wireless communications, not illustrated in the figure); addressing and receiving data from various aircraft and engine data buses 350.1; and a cockpit interface panel 350.3 and/or a remote cockpit control unit (CCU) 350.2.

(f) A system bus 303 may serve to transfer data and messages between elements of motherboard 310, and between motherboard 310 and various other sensors, microchips, and controllers of DAPU 307.

(g) Non-volatile data storage 320.3 provides long-term storage for sensor data, which may include some raw sensor data recorded over time; but typically includes processed (and thereby condensed) sensor data. Non-volatile storage 320.3 may take the form of hard disk drives, solid state drives (including flash drives and memory cards), recording on magnetized tape, storage on DVD or similar optical disks, or other forms of non-volatile storage now known or to be developed.

(h) A power supply 318, which may be mounted on CCA 310 or may be a separate element within the DAPU 307.

Volatile and non-volatile memory or storage 320.2/320.3, along with CPU 315, enable at the hardware level the operations of the DAPU 307 and also enable the operations of the present system and method.

Above it is indicated that a DAPU 307 contains internal memory 320.1/320.2. In some embodiments, a DAPU may have or be connected to/coupled with one or more memory receptacles or storage receptacles (MCRs) (not shown) configured to contain the memory 320.1/320.2 or storage 320.3, or in some embodiments to contain supplementary, backup, or additional memory 320.1/320.2 or storage 320.3, which can be inserted and removed via an exterior access port of the MCR.

Ports and connectors: Not shown in FIG. 3, but present somewhere on the surface of the DAPU 307, may be ports and connectors, such as USB ports, Ethernet ports, and various specialized connectors and ports for connecting distributed HUMS elements 350 to the DAPU 307. Some Vehicle Sensing/Monitor (VSMS) elements 350 may communicate with the DAPU 307 via wireless communications, for example on-board WiFi or Bluetooth connections, or other wireless connections. The DAPU 307 may have antennas and/or internal wireless circuitry (not shown in the figure) to enable such wireless data communications.

Vehicle Sensing/Monitoring System (VSMS) Elements

FIG. 3 also illustrates a variety of exemplary VSMS elements 350 which are typically part of or integrated into the vehicle 100, and which are connected to the DAPUs 307 via wires, cables, optical fibers, or possibly wireless means. These may include, for example and without limitation, one or more sensors such as one or more blade trackers 105 (or, for example, aircraft wing operations sensors) or the vibration sensors 110 employed by the present system and method.

Monitoring of Mechanical Phenomena, Behaviors, Properties, or States

The system and methods disclosed in this document are mainly taught as entailing the sensing of (i) vibrations of a component or components of a mechanical system or (ii) a time of arrival of a component or component at a particular point along a traversal path within a mechanical system (such as a transport system). However, persons skilled in the relevant arts will appreciate that the present system and method, with suitable mechanical property sensors or mechanical state/property sensors (MSP sensors), may be employed to sense other time-varying mechanical states, properties, phenomena, or behaviors of one or more mechanical elements within a mechanical system. For example, multiple suitable optical sensors, brush sensors, magnetic sensors, capacitive sensors or other sensors, with suitable processing, may be employed to sense for emerging cracks or "pitting" in a mechanical element, where early detection of an emerging structural crack or flaw may help prevent a safety hazard for the mechanical system. For another example, multiple suitable MSP sensors, with suitable processing, may be employed to sense small variations in position of a mechanical component (for example, due to a gradual-but-progressive failure of a supporting structural element for the sensed component).

Planetary (Epicyclic) Gear System with Single Vibration Sensor

Figure 4:
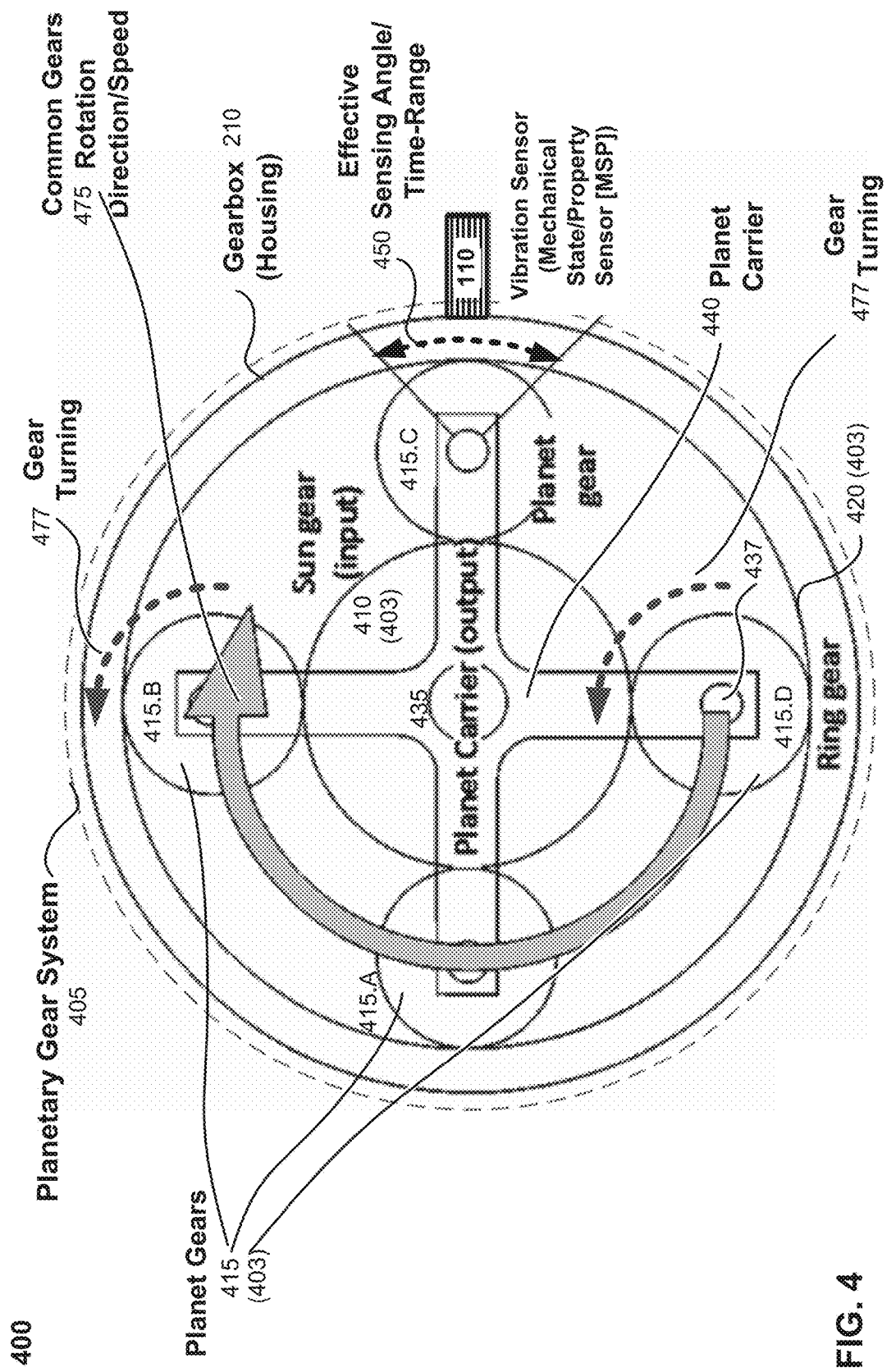
FIG. 4 illustrates an exemplary single-sensor planetary gear system as may be known in the art according to legacy systems.

FIG. 4 illustrates an exemplary single-sensor planetary gear system 400 as may be known in the art according to legacy systems. Single-sensor planetary gear system (SPGS) 400 has a planetary gear system 405 (also known in the art as an "epicyclic gear chain" 405) which in turn has a single vibration sensor 110 attached on the exterior of the gearbox 210.

For convenience herein, a planetary gear system/epicyclic gear chain 405 may be referred to herein, below, simply as a "gear system 405" or "gear chain 405".

A gear 403 (or cogwheel 403) is a rotating machine part having cut teeth (or in the case of a cogwheel, inserted teeth called cogs), which mesh with another toothed part to transmit torque (rotational force). A gear is typically flat and round, with teeth of equal sizes arranged adjacent to each other on the outer circumference. In some cases, a gear may have a hollow circular rim with the cogs arranged on the interior surface of the rim. The entire arrangement of gears 403 and planet carrier 440 is contained within a gearbox housing 210, which is generally maintained and secured within a fixed position within a vehicle 100.

Persons skilled in the relevant arts will appreciate that in FIG. 4, and for simplicity, the teeth have been omitted from gears 403 (sun gear 410, planet gears 415, and ring gear 420).

Planet gear systems 405 are well known in the art, and a detailed operational description is not provided here. But it will be observed that exemplary planetary gear system 405 has an inner sun gear 410 (with teeth on the outer circumference); four planet gears 415 (also with teeth on the outer circumference) arranged symmetrically and equidistantly around the sun gear 410; and an outer, hollow ring gear 420 (also known as an "annulus gear") with interior teeth, arranged symmetrically around the inner sun gear 410, around the four conjoined planet gears 415, and around a central axis or gearshaft 435. The four planet gears are arranged to be conjoined via the four symmetric arms of the planet carrier 440, which is centrally mounted on the gearshaft 435.

Persons skilled in the art will appreciate that the use of four planet gears 415 is exemplary only, and fewer (three) or more (four or more) may be employed.

Persons skilled in the art will also appreciate that a planetary gear system, such as exemplary gear system 405, is employed to transfer torque and rotational speed between the sun gear 410 and the ring gear 420 via rotation of the planet gears 415. For the planetary gears 415 and planet carrier 440 as a unit, the common speed/direction of rotation 475 may be either clockwise (as shown in FIG. 4) or counter-clockwise. As the planet gears 415 rotate, maintaining their fixed center-of-mass relations to each other, each planet gear 415 also turns around its own axis 437 with a turning speed/direction 477, the turning direction between opposite to direction of rotation 475.

Vibrations: The combination of both rotation 475 and gear turning 477 results in each planet gear 415 generating mechanical vibrations (537, see FIG. 5 below). The mechanical vibrations are analyzed to determine system health and assure operational safety. In legacy systems, a single vibration sensor 110 is situated at a fixed point on gearbox 210. As the planet gears 415 undergo rotation 475, each planet gear 415.g successively passes near the fixed location of sensor 110. Sensor 110, in turn, may then effectively detect vibrations 537 from a planet gear 415.g only while the planet gear 415.g is within an effective sensor angle 450, as illustrated in the figure; in turn, this means that each planet gear 415.g is within the detection range of vibration sensor 450 for only a fraction of the time required for one full rotational cycle of the planet gears in rotation direction 475. In this document, the effective angular range 450 within which a planet gear 415.g is within sensing range of a vibration sensor 110 may also be discussed, as appropriate, as an effective time range 450 of sensor detection by a gear. This may be referred to simply as "range 450" or "effective range 450", with the context making clear whether the angular range, time range, or possibly both are applicable.

Each planet gear 415.n passes within the effective sensor angle 450 just once per planet carrier rotation 475. Each time a planet gear 415.n passes this sensing point, a different part of the gear 415.n is visible (that is, is in closest contact with sensor 110), and so a signal average covering all gear teeth must be built up over a number of rotations (determined by gearbox geometry). Planet bearing monitoring is also challenging as a consistent load path to each bearing is not available.

Broadly speaking the epicyclic gear system 405 is a noisy monitoring environment, and so increasing the samples over which a signal average is created is desirable, but also increases the time to complete a vibration scan.

Consolidated Vibration Data from a Single Vibration Sensor

Figure 5:
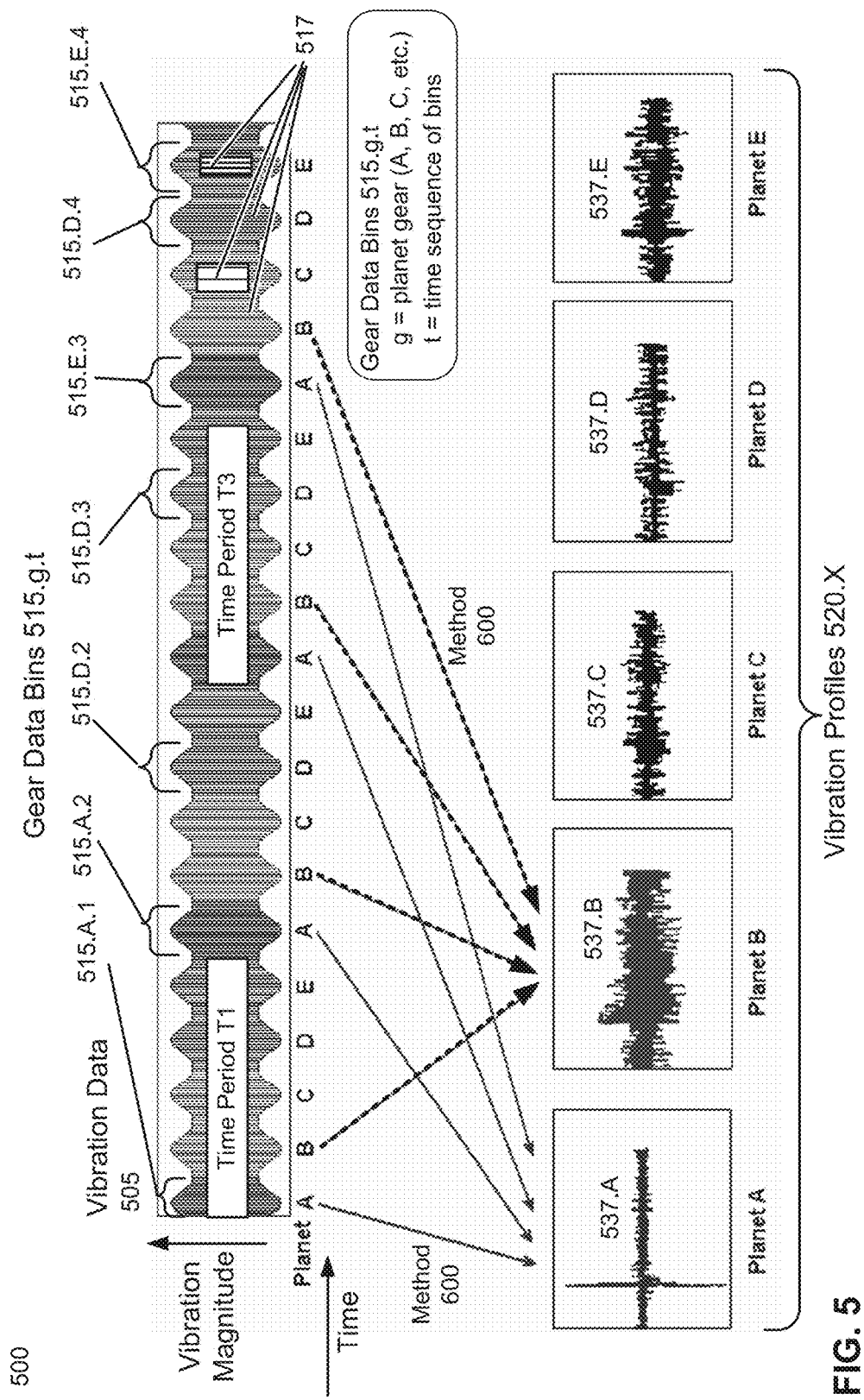
FIG. 5 illustrates an exemplary signal processing of averaged vibration data from a single vibration sensor for a transport vehicle.

FIG. 5 illustrates some aspects of the signal processing 500 of averaged mechanical state data, such as averaged vibration data from a single vibration sensor 110 for a legacy planetary gear system 400. The signal processing 500 illustrated in FIG. 5 is for a legacy system with five planetary gears 415, which may be purposes of explanation be named as planetary gears 'A', 'B', 'C', 'D', and 'E' (generally, planet gears 'N', corresponding to planet gears 415.g of FIG. 4). For the exemplary planetary gear system 400 with five planetary gears 415, vibration data 505 is acquired from a vibration sensor 110 that is positioned to detect vibrations 537 from the planet gears 415 (the "revolving component") as they pass within an effective sensor angle 450 or effective sensor range 450 of sensor 110.

Vibration signatures: Because the rotation speed (via a tachometer) and the geometry (via transfer of information from the gearbox manufacturer) are known for gear system 400, it is possible to assign one or more vibration signatures 517 to a "gear data bin" 515.N representing each gear 415.g on the gear system 400. Vibration signatures 517 may also be referred to as vibration data samples 517 or vibration signal samples 517, and may be indicative of vibration intensity, vibration frequency, or both.

FIG. 515 includes two "exploded vibration signatures" 517, or enlarged vibration signatures, representative of different levels of sensed vibration frequency and/or intensity. For each planetary gear 415.A, 415.B, 415.C, 415.D, and 415.E, multiple successive sensor data bins 515.g.t, each with one or more vibration signatures 517, are obtained over time periods (T).

For any one planetary gear 415.g, multiple data bins 515.g.t with their vibration data samples 517 may be combined over time to obtain a consolidated vibration profiles 520.N indicative of the vibrations 537.g of each planetary gear 415 over time. The vibration profiles 520.N reflect the actual vibrations 537.g of each planet gear 415.

Method for Vibration Sensing With A Single Sensor

In general, however, it is desirable to obtain not only an approximate (e.g., time averaged or representative) vibration data for each planetary gear 415.g. Rather, it is desirable to obtain tooth-specific or tooth-localized vibration data 505 for each tooth (or a series of closely-spaced adjacent teeth) for each planetary gear 415.g. (As per above, gear teeth are not illustrated in FIG. 4.)

Again because there is a known rotation speed (via a tachometer) and the system geometry (via transfer of information from the gearbox manufacturer) for exemplary gear system (410) with single vibration sensor (110), it is possible to assign vibration signatures 517 to a "teeth bin" representing each tooth on each planet gear 415.g, based on a time-offset from the first acquisition.

On each pass a given planet gear 415.g presents a different set of gear teeth to the ring gear 420 over the effective angular range 450 at which vibrations are sensed by vibration sensor 110. Consequently, many revolutions 475 of the planet gears 415 are necessary before vibration signatures 517 are observed from each and every tooth on each planet gear 415.

Furthermore, throughout the vibration sensing process, signal averaging is typically employed to reduce the distortions from random noise. This means that when employing only one vibration sensor 110, multiple vibration signatures 517 from each tooth on each gear 415.g are required to build up a sample to average over, further increasing the number of planet gear revolutions 475 required.

Because the rotation speed (via a tachometer) and the geometry (via transfer of information from the gearbox manufacturer) are known, it is possible to assign vibration signatures 517 to a "tooth bin" representing teeth on the planet gear based on a time-offset from the first acquisition.

As is known in the art, typical planet gears 415 may have many teeth, numbering in the dozens or even hundreds. However, in an exemplary case, and for each planet gear 415.g, only a few gear teeth (for example, three (3) gear teeth or six (6) gear teeth) from among the total number of gear teeth may be visible for each interval of vibration sensor data acquisition.

As discussed in detail below a method may be employed for gear-and-teeth specific vibration sensing, such as exemplary method 600 below. In the exemplary instance with vibration data acquisition for six (6) gear teeth at a time, and during the first acquisition time window (for acquisition of vibration data for gear bins 515.A.1 through 515.E.1), the vibration samples for each gear tooth are assigned to tooth vibration bins one (1) through five (5). (For example, planet gear 415.A may have 70 teeth, so the vibration data for planet gear 415.A is divided into tooth bins which may be numbered 1 to 70.) The initial gear vibration readings may then be stored in tooth data bins 1 through 6 (for example, tooth data bins addressed as A.1.1 through A.1.6).

The second time the same planet gear (for example, 415.A) passes by sensor 110, it will be known that the teeth presented are offset by "x" from the first acquisition. For this acquisition the time windowed vibration samples are assigned to tooth data bins x+1 through x+6 (which may be identified as A.2.x+1 through A.2.x+6). This process continues until the averaged signal for each bin shows minimal difference from the previously calculated average, as determined by a signal convergence check.

Method for Tooth-Specific Vibration Sensing With A Single Sensor

Figure 6:
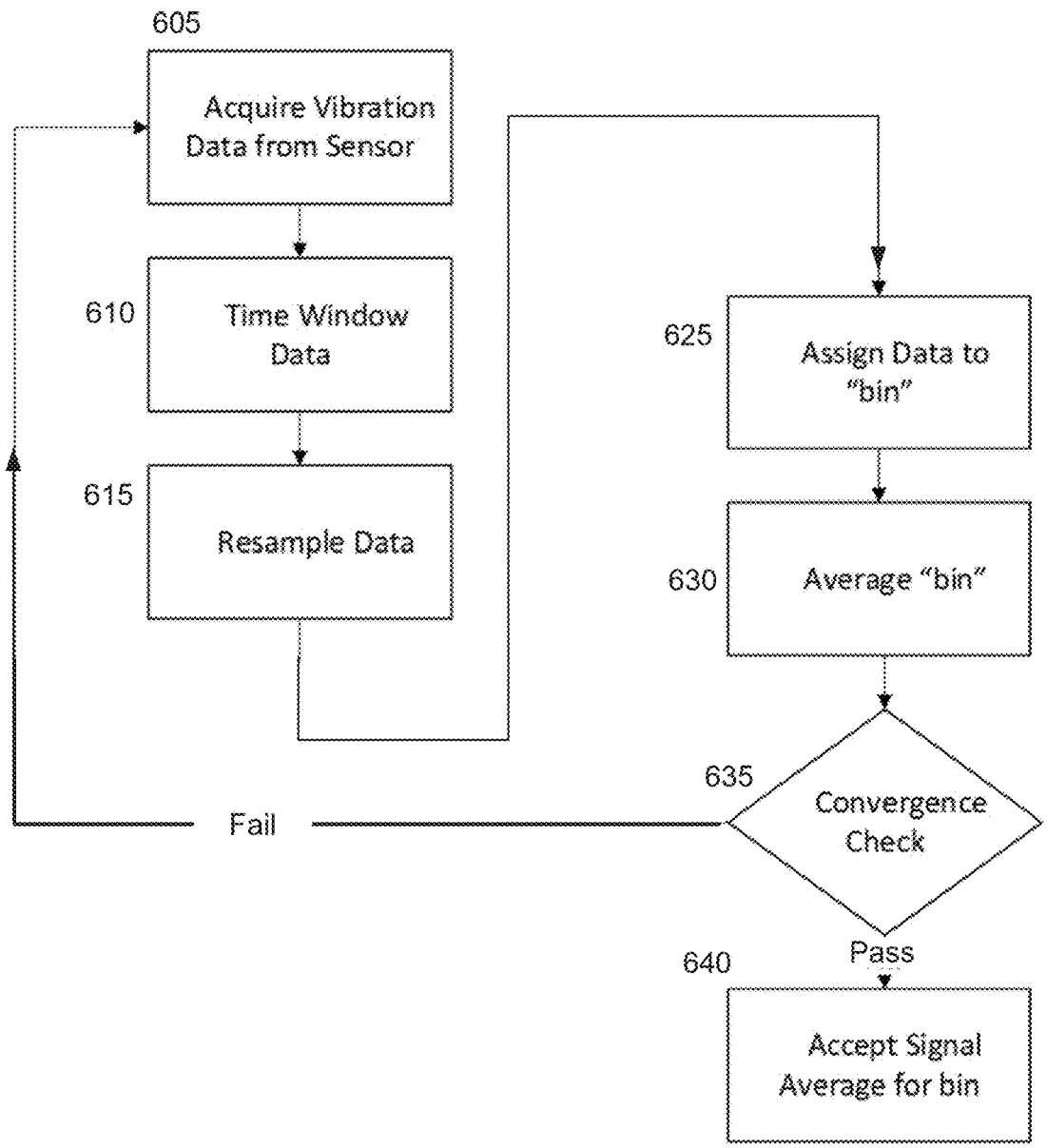
FIG. 6 is a flow-chart of an exemplary method for vibration sensing with a single sensor.

The process for legacy systems with one single vibration sensor 110 can be summarised as follows, according to method 600 of FIG. 6.

The method begins with step 605, which entails continuously acquiring vibration data 505 from single vibration sensor 110.

In step 610, time windows are applied to identify both the specific planetary gear 415.g, and to extract from the gear's data bin 515.g.t the vibration data 505 for each tooth.

The method continues with step 615, which resamples the data to reduce the number of points stored. (This step is a practical consideration. The vibration signatures 517 are typically acquired at a much higher frequency than is needed for planet gears 415, and the extraneous data would create an unnecessary processing overhead.)

The method continues with step 625, where the windowed and resampled data 517 is assigned to a gear-specific tooth bin representing the gear-tooth to which it pertains. [It is noted that a step numbering of "620" is deliberately not used for flowchart 600.]

The method continues with step 630. In step 630, a signal average is calculated from all vibration signal samples 517 assigned to each tooth bin.

The next step, step 635, applies to each tooth bin a convergence check. The convergence check is used to compare the signal average just calculated to the signal average from the previous iteration.

If the signal convergence is below a configured value (meaning the signal has not converged sufficiently to indicate a stable signal average), then more vibration acquisitions are required, entailing a return to step 605. If in step 635 the signal convergence is satisfactory (that is, above the configured signal convergence threshold), the averaged vibration data for the tooth bin is accepted.

When averages for all bins are accepted no further vibration acquisitions are required to establish a current level of vibration for the planetary gears 415. However, vibration monitoring may be continued, and the method 600 repeated, to determine any changes in the vibration levels 500 of gear system with single sensor (400).

As noted above, the epicyclic gearbox 405 is a noisy monitoring environment. Therefore, with a single sensor, lengthy scan times may be required and to provide adequate signal averaging and convergence. The present system and method addresses this deficiency, among others.

Exemplary Planetary Gear System With Multiple Vibration Sensors

Figure 7:
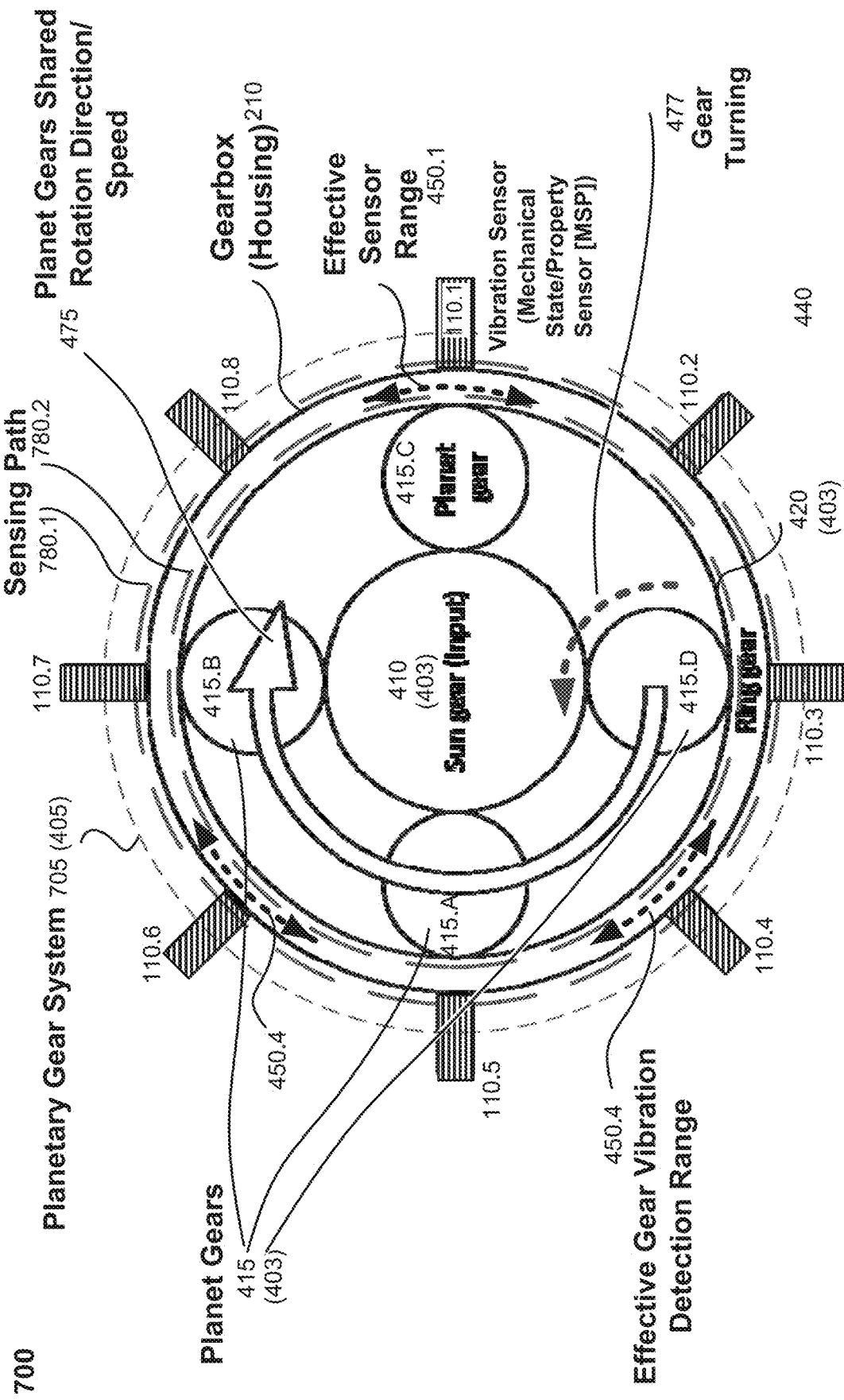
FIG. 7 illustrates an exemplary multi-sensor planetary gear system (MSPGS).

FIG. 7 illustrates one embodiment of an exemplary multi-sensor planetary gear system (MSPGS) 700 according to the present system and method. Exemplary multi-sensor planetary gear system 700 has a planetary gear system 705 (epicyclic gear chain 405) with multiple vibration sensors 110.s, which in an exemplary embodiment, may be attached on the exterior of the gearbox 210. In an alternative embodiment (not illustrated), the vibration sensors 110.s may be mounted directly on a surface of the ring gear 420. In various embodiments, vibration sensors 110.1 which are attached directly to ring gear 420 may be mounted on:

(i) the exterior surface of ring gear 420 (that is, a surface which faces away from the sun gear 410 and the planet gears 415;

(ii) an interior surface of the ring gear 420 (the surface which faces the sun gear 410 and right gears 415), for example on a ring gear 420 which is wider than the planet gears 415, thereby having an interior surface which may not make contact with the planet gears and so provides a suitable interior surface for the vibration sensors 110.1; or (iii) either of the two surfaces on the transverse plane of the ring gear 420.

Though not illustrated in FIG. 7, it will be understood that in an embodiment, the multiple vibration sensors 110.s are communicatively coupled with a DAPU/HUMS 307 to which performs that data processing methods and calculations of the present system and method. In alternative embodiment (also not illustrated, some or all hardware processing elements 307 which are required to support the present system and method may be structurally integrated into the planetary gear system 700 with multiple vibration sensors 110.s.

The exemplary planetary gear system 705 may be the same or substantially similar to the planetary gear system 405 of FIG. 4, and a detailed discussion of its elements is not repeated here. Persons skilled in the relevant arts will appreciate that the four planetary gears 415.g shown in FIG. 7 are exemplary only, and that the planetary gear system 705 may have fewer or more planetary gears 415, such as for example and without limitation three (3) planetary gears or five (5) planetary gears, or more.

Similarly, the rotation direction 475 illustrated in the figure is exemplary only, and a reverse rotation may be employed. The sun gear 410 may be fixed so that the angular output of the gear system 705 is transmitted via the ring gear 420; or the ring gear 420 may be fixed in position. Similarly, multiple sizes and configurations of gear teeth (not shown in the figure) may be employed, as is known in the art, consistent with the present system and method. The relative sizes of gears 403, such as sun gear 410, planet gears 415, and ring gear 420 are also exemplary and for purposes of illustration only, and should not be construed as limiting.

Persons skilled in the relevant arts will appreciate that in FIG. 7, and for simplicity of illustration only, the gear teeth have been omitted from gears 403 (sun gear 410, planet gears 415, and ring gear 420).

Vibrations: As with legacy systems, the combination of both rotation 475 and gear turning 477 results in each planet gear 415 generating vibrations 537. For system health and operational safety, mechanical vibrations 537 are analyzed to determine consistency with system health and operation safety parameters/limits.

In exemplary embodiment of multi-sensor planetary gear system (MSPGS) 700, multiple vibration sensors 110.s are deployed on the exterior of gearbox 210 of planetary gear system 705. Each vibration sensor 110.s is situated at a fixed point on gearbox 210. In an alternative embodiment, and as discussed above, the multiple vibration sensors 110.2 are affixed to specified points directly on the ring gear 420. As the planet gears 415 undergo rotation 475, each planet gear 415.g successively passes near each of the fixed locations of multiple sensors 110.s. Each vibration sensor 110.s may, in turn, effectively detect vibrations from each of the planet gears 415.g when each respective planet gear 415.g is within an effective sensor angle 450 for the vibration sensor 110.s.

Number of Vibration Sensors: The number (s) of vibration sensors 110 illustrated in MSPGS 700 is eight (8), but this number of vibration sensors is exemplary only and not limiting. Fewer sensors (for example, just two (2)), or more than eight (for example, ten (10) or more vibration sensors) may be employed. In one embodiment of the present system and method, there may be one vibration sensor 110.s deployed on the gearbox 210 for each planetary gear 415.g. (That is "s" may equal "g.") In an alternative embodiment, the number (s) of vibration sensors 110 may be twice the number (g) of planet gears 415, or three or four times the number (n) of planet gears 415.

In an alternative embodiment, the number (s) of vibration sensors 110 deployed may be system-specific, and is determined by for example a lowest number (L) of vibration sensors 110 required to ensure that each planet gear 415.g is always detected by at least one vibration sensor 110.g. In yet another alternative embodiment, the number of vibration sensors 110 deployed may be greater than L, providing for varying degrees of sensing redundancy, so that at any time the vibrations from at least some planetary gears 415 are detected by more than one vibration sensor 110. Such sensor redundancy may allow for more refined determinations of vibration data, or may help compensate for an exceptionally vibration-noisy planetary gear system 705, or for an exceptionally vibration-prone/noisy local internal environment of the vehicle 100.

Positioning/Spacing of Vibration Sensors: In some embodiments of the present system and method, the multiple vibration sensors 110 are spaced as shown in FIG. 7, that is, equidistantly along a circular sensing path 780 which aligned with a transverse plane that cuts through the gearbox 210 (that is, a plane which coincides with the transverse planes of sun gear 410, planet gears 415, and ring gear 420; the circular path being co-axial with the central axis of the sun gear 410 and ring gear 420. In an embodiment where the sensors 110 are attached to the exterior of the gearbox housing 210 (as shown in FIG. 7), the sensing path 780.1 is substantially along that exterior surface. In an alternative embodiment where the sensors 110 are affixed to the ring gear 420 (not illustrated in FIG. 7), the sensing path 780.2 substantially coincides with the arc formed by the points of attachment of the sensors 110 to the ring gear 420.

In an alternative embodiment, some portions or arcs along the sensing path 780 may be more densely populated with vibration sensors 110 (meaning along the entire arc of the vibration sensors 110), with some pairs of adjacent sensors 110.s spaced more closely to each other than pairs of adjacent vibration sensors 110.s. For example, a particular arc portion of the sensing path 780 may receive additional, fixed-location vibration sensors 110 if it is known or anticipated that such portion of the arc will be oriented towards or otherwise coupled with other proximate vehicle systems which are anticipated to generate an exceptional amount of vibration noise or audio noises.

Operational Effect of Multiple Vibration Sensors: In various embodiments of a multi-sensor planetary gear system (MSPGS) 700, planet gear vibrations 537 are sampled across the multiple sensor locations as the planet gears 415 rotate in unison along the interior gear surface of ring gear 420. Synchronous time-windowing is then used to identify and separate respective time periods of interest with sensor data relating to a planet gear 415.g of interest. These time windows are then aggregated and averaged across multiple rotations, which is then used as an input to the DAPU/HUMS 307 condition indicator calculations. Details of this method are discussed further immediately below.

In some embodiments, the combined results of using multiple sensors 110 and the time-windowing methods of the present system and method have the constructive effect of making the planet gears 415.g appear "stationary" in relation to a single "virtual vibration sensor"; the vibration data for the single virtual sensor is constructed (as discussed below) as a composite based on data from what are actually multiple separate vibration sensors 110.s. As the relative position between each planet gears 415.g and the virtual vibration sensor remains substantially constant, all parts of the gearbox housing 210 can be monitored continuously for vibration data (rather than once per carrier rotation as with legacy systems with one sensor).

Consolidated Vibration Data from Multiple Vibration Sensors

Figure 8:
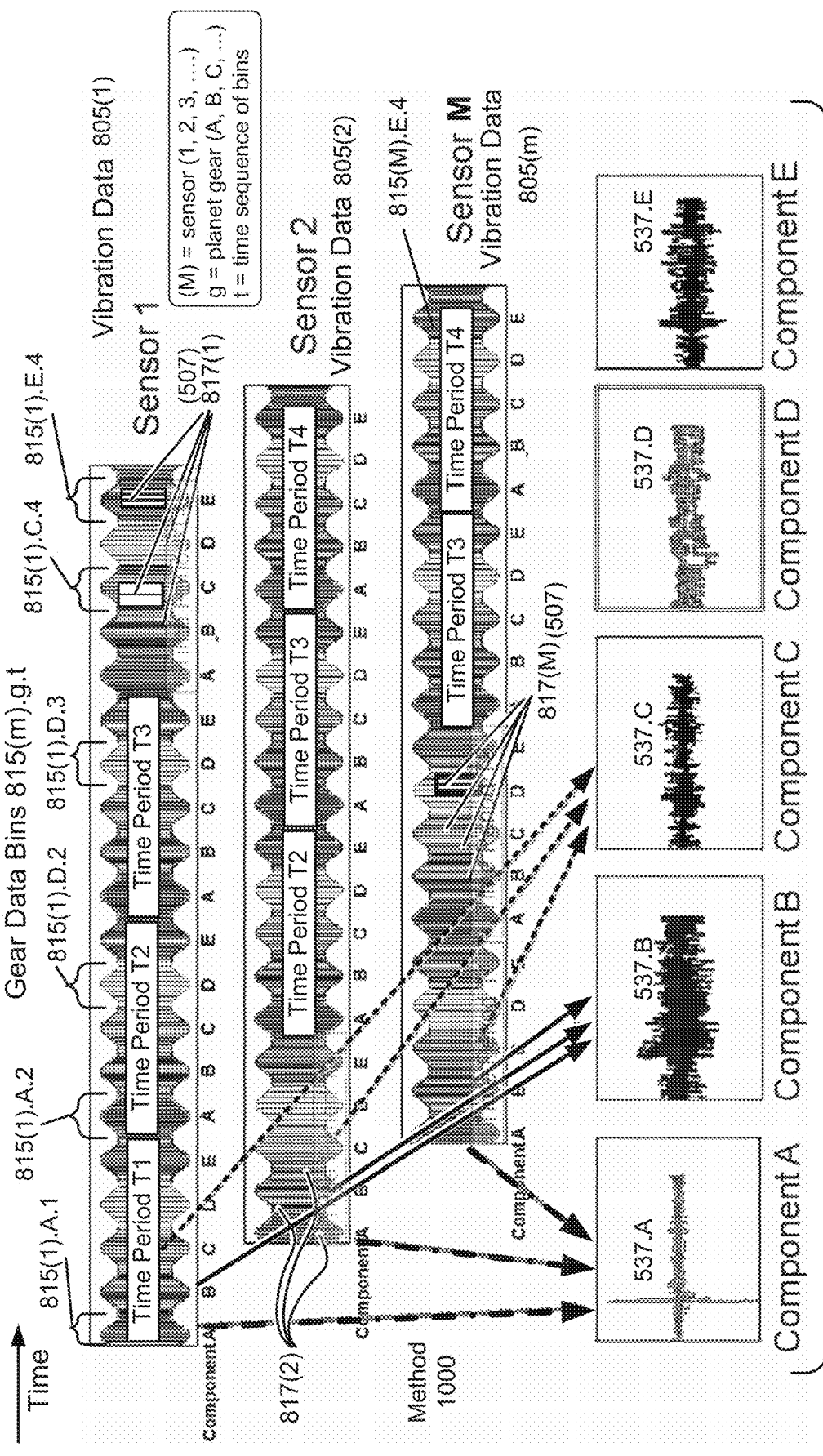
FIG. 8 illustrates an exemplary signal processing of consolidated vibration data from multiple vibration sensors for a multi-sensor planetary gear system (MSPGS).

FIG. 8 illustrates schematically some aspects of the signal processing 800 which may generate consolidated vibration data 820.g for each respective planetary gear 415.g from the multiple vibration sensors 110.s for a multi-sensor planetary gear system (MSPGS) 700 according to the present system and method.

The signal processing 800 illustrated in FIG. 8 is for an exemplary system with five (5) planetary gears 415, for example planetary gears 'A', 'B', 'C', 'D', and 'E' (generally, planet gears 'N', corresponding to planet gears 415.g of FIG. 7). For the exemplary planetary gear system 700 with five planetary gears 415, respective vibration data 815(s) is acquired from each vibration sensor 110.s that is positioned to detect vibrations 537 from the planet gears 415 as they pass within an effective sensor angle/range 450 of each of the multiple sensors 110.s.

Illustrated in FIG. 8 are "components" A, B, C, D, E. For purposes of the present system and method, the term "component" may be understood as either of a planet gear 415, or as a tooth (or cog) (not illustrated in the figures) on a particular planet gear 415.

For each respective planet gear 415.g of the plurality, and for each vibration sensor 110.s of the plurality (or other periodically rotating element, as applicable), the present system and method determines an element-dependent and sensor-dependent time range (GDSD time range) when a given planet gear 415.g passes within a sensing range 450.s of a given sensor 110.s. Because the rotation speed (via a tachometer) and the geometry (via transfer of information from the gearbox manufacturer) are known for gear system 705, it is possible to assign vibration signatures 517 to "gear data bins" 815(s).g.t which each represent: (i) vibration data for each gear 815.g as (ii) detected by each sensor 110.s. For each planetary gear 415.A, 415.B, 415.C, 415.D, 415.E, multiple successive sensor data bins 815(s).g.t are then obtained from each vibration sensor 110.s over successive time periods (T).

For any one planetary gear 415.g, and based on vibration sensor data bins 815(s).g.t from multiple vibration sensors 110.s, their vibration data samples may be combined over time to obtain a consolidated vibration profiles 820.g indicative of the vibrations 537.g of each planetary gear 415.g or each tooth on each planetary gear over time.

Process for Vibration Sensing With Multiple Sensors

As discussed above, it is desirable to obtain not only an overall vibration data for each planetary gear 415.g. Rather, it is desirable to obtain tooth-specific or tooth-localized vibration data 505 for each tooth (or a series of closely-spaced adjacent teeth) for each planetary gear 415.g. (As per above, gear teeth are not illustrated in FIG. 4.)

Vibration signatures: As discussed above, and due to the known rotation speed 475 of shared planetary gears rotation (known via a tachometer), and due to the known system geometry (via transfer of information from the gearbox manufacturer) for exemplary gear system (700) with multiple vibration sensors (110.s), in an embodiment it is possible to detect vibrations 537 from individual gear teeth. In an alternative embodiment, vibrations 537 may be ascertained with respect to identifiable small subsets of teeth among the overall gear teeth.

It is then possible to assign sensor-specific tooth vibration signatures 817(g) to "teeth bin" representing each tooth on each planet gear 415.g, based on a time-offset from the first acquisition. As discussed above, and similar to vibration signatures 517 for a legacy single sensor system, in various embodiments a vibration signature 817(g) may be a single value indicating a level of vibration each time a gear tooth is sensed; or a time series of values over a short time interval over which a gear tooth is sensed; or some other digital characterization of vibration intensity when a gear tooth is sensed; in alternative embodiments, a vibration signature 817(g) may be understood as a series of vibration values, or a waveform representation of vibration values, over some more extended time over which a gear tooth is repeatedly sensed. The sensor-specific vibration signature 817(g) for a gear tooth may also be known in this document as a "tooth vibration signature" 817(g).

In an embodiment of the present system and method, a whole collection of vibration signatures 817 for all the teeth on a gear 415, and from all the sensors 415.1, may be viewed as a gear vibration profile 820.g for the entire gear. In an alternative embodiment, a gear vibration profile 820 may be determined by analysis or storage of a subset of tooth vibration signatures, or by a processed summary (such as an average, peak values, or minimum values) of multiple tooth vibration signatures 817 for a period of time.

Persons skilled in the relevant arts will appreciate that it is a purpose and effect of the present system and method to accurately and quickly identify, over time, variations in vibration signatures—either or both of tooth vibration signatures and/or gear vibration signatures—which may indicate stresses on, damage too, or problems with a planetary gear system 705.

Process: An exemplary process 800 of data acquisition for a planetary gear system 705 with multiple vibration sensors 110.g, according to the present system and method, may entail some elements which are illustrated in part in FIG. 8 and are discussed in detail immediately below. Exemplary process 800 may be performed for example by a DAPU 307 which is communicative coupled to the multiple vibration sensors 110.s. The hardware processor 315 of the DAPU 307 may perform the method steps in accordance with software stored in the memory 320 of the DAPU 307.

Each of the multiple vibrations sensors 110.g has an effective sensor range 450.g, which may also be referred to as an "effective gear vibration detection range" 450.g, as illustrated in FIG. 7 (above). On each full rotation 475, each given planet gear 415.g presents a different subset of gear teeth to each vibration sensor 110.s situated around the ring gear 420. For each sensor 110.s, this subset of gear teeth is detected over the effective angular range 450.n of sensor 110.s.

In an embodiment of the present system and method, a single revolution 475 of the planet gears 415 (such as any one of time periods T1, T2, T3, or T4) may be sufficient to observe, via the multiple sensors 110.s, all of the vibration signatures 820 for each tooth on each planet gear 415.

In an embodiment of the present system and method, signal averaging is employed to reduce the distortions from random noise. This means that even when employing multiple vibration sensors 110.s, multiple vibration signatures collected over multiple revolution time periods T, from each tooth on each gear 415.g, may be required to build up a sample to average over. However, with multiple sensors 110.s employed, it is expected that a sufficiently reliable vibration profile 820 may be acquired with fewer planet gear revolutions 475 than the number of revolutions required under legacy systems.

The planet gear rotation speed (via a tachometer) and the geometry (via transfer of information from the gearbox manufacturer) are known. It is therefore possible to assign, for each vibration sensor 110.s, vibration signatures 817(g) to sensor-specific, gear-specific, and tooth-specific tooth bins which represent representing teeth on the planet gear as sensed by each sensor 110.s, all based on a time-offset from the first acquisition.

As discussed in detail below a method may be employed for sensor-specific, and gear-and-teeth specific vibration sensing, such as exemplary method 900 below. In the exemplary instance with vibration data acquisition for six (6) gear teeth at a time:

For a first vibration sensor 110.1, and during first time window (that is, a first portion of the first acquisition time period T1), the first vibration sensor may acquire vibration data for gear bin 815.A.1 representing vibration data from gear 415.A, with the vibration samples 817(1) for each gear tooth being assigned to tooth vibration bins one (1) through five (6) for the first vibration sensor 110.1.

For a second vibration sensor 110.2, and during the same first time window, (the same first portion of the first acquisition time period T1), the second vibration sensor may acquire of vibration data for gear bin 815.B.1 representing vibration data from gear 415.B, with the vibration samples 817(2) for each gear tooth of gear 415.B being assigned to tooth vibration bins seven (7) through twelve (12) for the second vibration sensor 110.1.

For an Jth vibration sensor 110.J, and during the same first time window (the same first portion of the first acquisition time period T1), the Jth vibration sensor may (i) first acquire vibration data first for gear bin 815.C.1 representing vibration data from gear 415.C, with the vibration samples 817(J) for each gear tooth of gear 415.0 being assigned to tooth vibration bins k through k+3 for the Jth vibration sensor 110.1, and (ii) then acquire vibration data first for gear bin 815.D.1 representing vibration data from gear 415.D, with the vibration samples 817(J) for each gear tooth of gear 415.J being assigned to tooth vibration bins k+4 to k+6 for the Jth vibration sensor 110.J.

Subsequently, for each vibration sensor 110.s, and during a second time window (a second portion of the first acquisition time period T1), each vibration sensor 110.s will acquire six (6) bins of tooth vibration data for a series of adjacent teeth for a successive gear.

Persons skilled in the relevant arts will appreciate that the values provided above are exemplary only. For each sensor 110.s, all of the following may vary during any given portion of a full rotation time period T, due to the number of planet gears 415, due to the rotation speed/direction 475, and due to the relative sizes of the planet gears 415, sun gear 410, and ring gear 420: the planet gear 415.g detected, and which teeth on the gear are detected. Further, it is possible that during some time periods T, one or more vibration sensors 110 may detect vibrations from no planet gear, or detect vibrations from teeth from two successive planet gears.

As shown in FIG. 8, however, a completed vibration profile 820.g for an entire planet gear 415.g, or for specific teeth of a planet gear 415.g.tooth, may be constructed from one or more gear bins (g) from each and all of the vibration sensors 110.s. This improves sensor accuracy and decreases the number of rotation periods T required as compared with legacy systems.

Exemplary Method Elements

Figure 9:
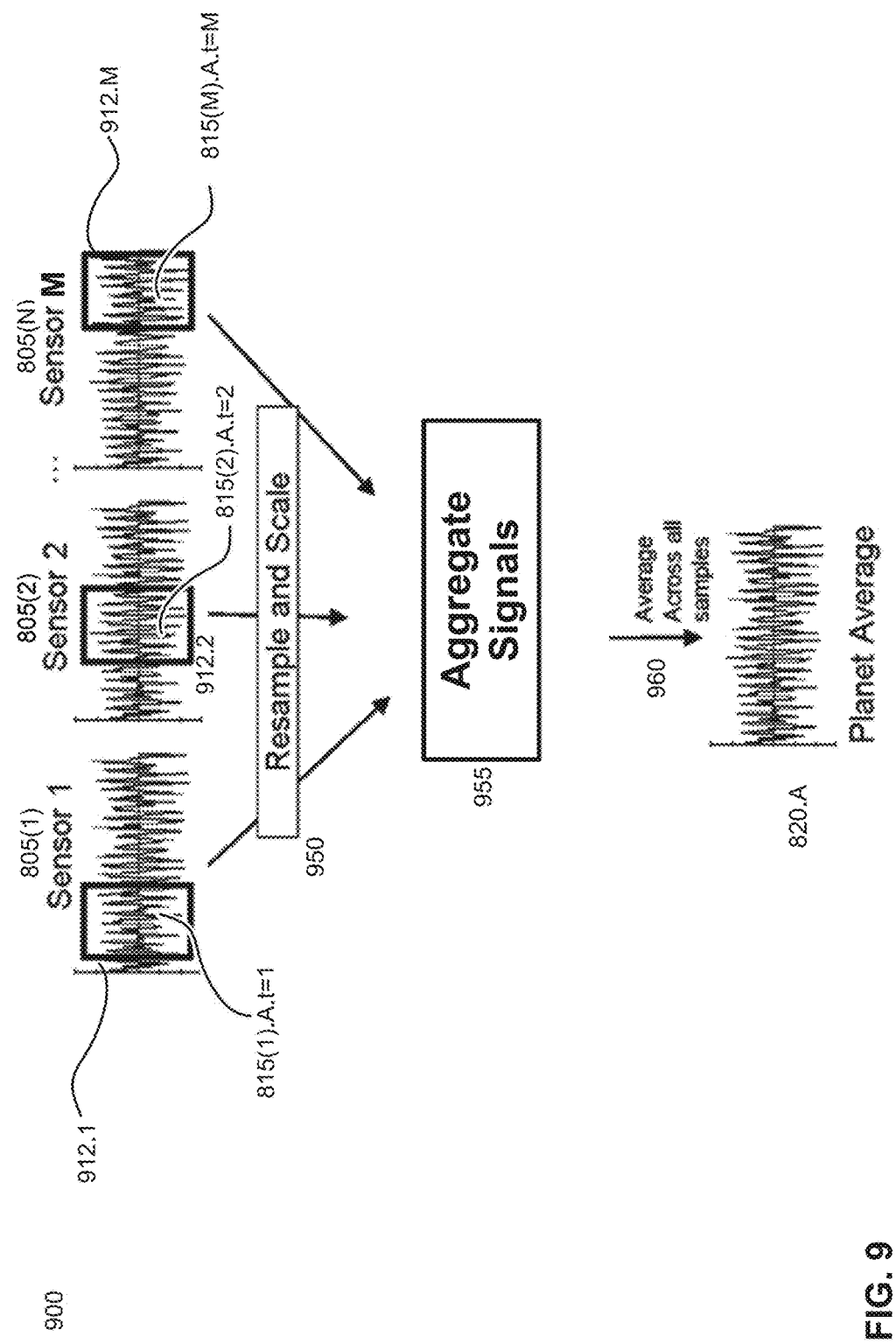
FIG. 9 illustrates elements of an exemplary method of signal processing and consolidating vibration data from multiple vibration sensors for a multi-sensor planetary gear system according to the present system and method.

FIG. 9 illustrates some elements of an exemplary method 900 of consolidating vibration data from multiple vibration sensors and for signal processing for a multi-sensor planetary gear system according to the present system and method. The method 900 may be performed for example by a DAPU 307 which is communicative coupled to the multiple vibration sensors 110.s. The hardware processor 315 of the DAPU 307 may perform the method steps in accordance with software stored in the memory 320 of the DAPU 307.

In method 900, vibrations 537 from an exemplary rotary mechanical system 700 is sampled across multiple locations by respective multiple sensors (s) to obtain multiple vibration data samples 805(s), for example at multiple different angular positions along a gearbox housing 210 or along the ring gear 420 of the rotary mechanical system 700. The data vibration data 805 is sampled at the multiple angular locations via fixed, distributed vibration sensors 110(s) (110(1) 110(2) ... 110(M). Synchronous time windows 912.t are applied to separate periods of interest relating to a common mechanical component of interest, for example relating to a rotating planet gear 415.A.

Synchronous time windows 912.t are defined as time windows (brief time intervals) which may occur at different specific times (t) at each sensor (s), but each synchronous time window corresponds to capturing vibration data from a particular common mechanical component, for example to a common rotating planet gear 415.K (where K is any specific gear from gear 1 through gear G). The times (t) are calculated by the hardware processor 315 as a function of each sensor location, the rotation speed 475 of the planet gears 415, and the overall geometry and spatial arrangement of the planetary gear system 705.

In the exemplary case illustrated, this result is multiple bins 815(sensor).gear_A.time of gear data 805 for planet gear 415.A, each of the multiple bins 815(s).A.t indicative of data:

from a particular sensor (for example, s=sensor 1, 2, ... M);

for the particular common gear (in the exemplary case, g=gear A); and for successive time windows 912.t (in the exemplary case illustrated, time intervals t=1, or t=2, or t=m), so as to capture from each sensor (s)=1, 2, ... M the vibration data for the common gear (g=gear A, in the exemplary case shown).

This results in the capture of exemplary data bins 815(s).g=A.t.

In a method step 950, these data bins 815 are both resampled over multiple rotations 475 of the planetary gear system; and then all the data bins are scaled by a configured sensor-specific factor, to ensure that data from each sensor 110(s) is of a similar amplitude. Scaling my be accomplished through various methods including, for example and without limitation: software data rescaling, adjusting signal gain, or other electronic means. Rescaling compensates for design and manufacturing variations between sensors 110, and for variations in sensor placement along the gearbox housing 210, and other factors which may make sensor data be different than nominal sensor data.

In a step 955, data bins are aggregated, for example associating all the data bins 805 from multiple sensors (s) from different time periods (t) which are associated with a given gear g (for example, g=A). In a step 960, these signals may be averaged.

Aggregated and averaging across multiple rotations the data from multiple sensors over multiple time periods results in a time averaged vibration profile 820.g for each gear 415 of the planetary system. These results are then used as an input to the HUMS 307 condition indicator calculations or as input to other DAPUs 307.

The effect of exemplary process 900 is to makes each planet gear 415.g appear "stationary", as the relative position between each gear 415.g and an apparent single "virtual sensor" remains constant. As a further result, and all planet gears 415 of the planetary gear system 705 can be monitored continuously, rather than once per carrier rotation 475.

While elements of a method 800 and a method 900 have been described above with respect to acquiring per-gear sampling data, analogous methods with more refined or narrow time windows may also be applied to collect vibration data for specific gear teeth from multiple sensors 110.s.

Exemplary Method for Tooth-Specific Vibration Sensing With Multiple Sensors

Figure 10:
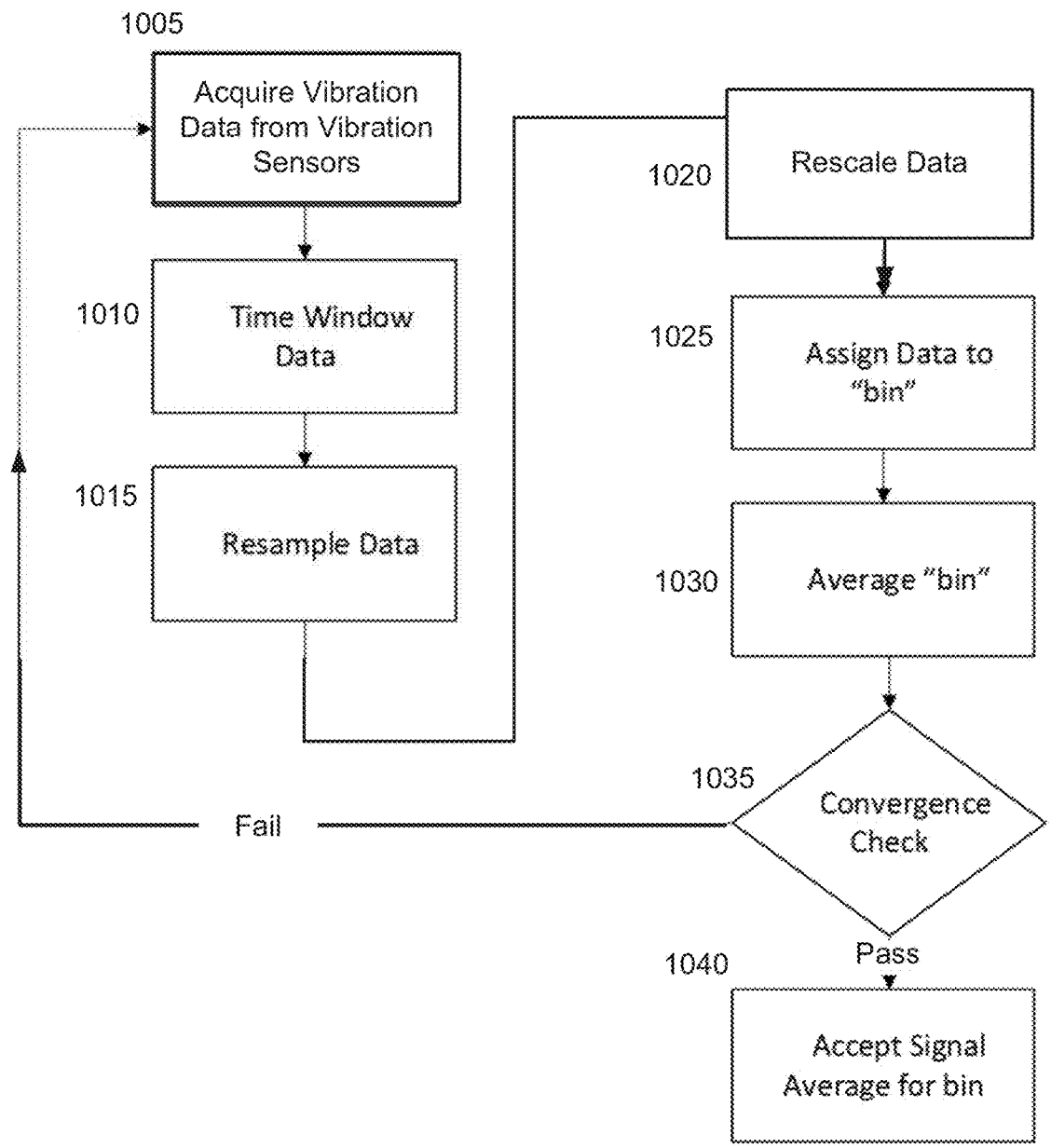
FIG. 10 is a flow chart of an exemplary method 1000 for vibration sensing with multiple vibration sensors.

Another exemplary method 1000 for vibration sensing with multiple vibration sensors 110.s is presented in FIG. 10. The method 1000 may be performed for example by a DAPU 307 which is communicative coupled to the multiple vibration sensors 110.s. The hardware processor 315 of the DAPU 307 may perform the method steps according to software instructions stored in the memory 320 of the DAPU 307. Some steps of method may be the same as or similar to the steps of legacy method 600 presented above, but with suitable adaptations for multiple sensors 110.s. Method 1000 also has a method step 1020 which has no analogous or similar step in method 600.

The method 1000 begins with step 1005, which entails continuously acquiring vibration data 805 from each and all of the multiple vibration sensors 110.s.

In step 1010, for each sensor (s), time windows are applied to identify both the specific planetary gear(s) 415.g being sensed, and to extract from the gear's data bins 815(s).g.t the vibration data 805 for each tooth.

The method continues with step 1015, which resamples the data to reduce the number of points stored. (This step is a practical consideration. The vibration signatures 817 are typically acquired at a much higher frequency than is needed for planet gears 415, and the extraneous data would create an unnecessary processing overhead.)

The method continues with step 1020. In step 1020, data from each vibration sensor 110.s is rescaled, by a configured sensor-specific factor, to ensure that data from each sensor 110.s is of a similar amplitude. Scaling my be accomplished through various methods including, for example and without limitation: software data rescaling, adjusting signal gain, or other electronic means. Rescaling compensates for design and manufacturing variations between sensors 100, and for variations in sensor placement along the gearbox housing 210, and other factors which may make sensor data be different than nominal sensor data. The rescaling factor for each sensor 110.s may be determined by a system operator, by manually examining vibration signatures from each sensing point as compared among different sensors for a common planet gear (or for each separate planet gear); or via algorithms designed to determine rescaling factors according to suitable criteria.

The method continues with step 1025, where the windowed and resampled data 817 for each sensor (s), that is a vibration signature 817(s), is assigned to a gear-specific tooth bin representing the gear-tooth to which it pertains.

The method continues with step 1030. In step 1030, a signal average is calculated from all vibration signatures 817(1), 817(2), . . . 817(s), and the calculated average is assigned to (that is, stored in) a common, master tooth bin for each tooth of each gear 415.g.

The next step, step 1035, applies to each tooth bin a convergence check. The convergence check is used to compare the signal average just calculated to the signal average from the previous iteration.

If the signal convergence is below a configured value (meaning the signal has not converged sufficiently to indicate a stable signal value), then more vibration acquisitions are required, entailing a return to step 1005. If in step 1035 the signal convergence is satisfactory (that is, above the configured signal convergence threshold), the averaged vibration data 817 for the tooth bin is accepted.

When averages for all tooth bins are accepted, then no further vibration acquisitions are required to establish a current level of vibration for the planetary gears 415. However, vibration monitoring may be continued, and the method 1000 repeated, to determine any changes in the vibration levels 500 of gear system with multiple sensors (700).

As noted above, with multiple sensors 110.1, convergence time decreases due to increased effective sampling rates for each tooth of each planet gear 415. Therefore, with multiple sensors, reduced scan times may provide adequate signal averaging and convergence, as compared to scan times for single sensor systems.

Exemplary Method for Vibration Sensing with Multiple Sensors

Consistent with methods 800, 900, and 1000 discussed above, another exemplary method for vibration sensing with multiple sensors 805(s) may entail:

(1) From the vibrations sensor 110.s, obtain at the hardware processor 315 of a DAPU 307 the time-continuous vibration sensor signals/data 805 indicative of the sensed vibrations from the planet gears 415.

(2) For the first vibration signal 805(1) of the first vibration sensor 110.1, determining via the hardware processor 315 a series of consecutive time windows when each planet gear 415.g passes within sensing range of the first vibration sensor 110.1; based on this first series of time windows, determining a first group of respective gear data bins 815(1).X.t which each includes vibration sensor data for only one specific planet gear 415.X.

(3) For the second vibration signal 805(2) from the second vibration sensor 110.2, determining via the hardware processor 315 a series of consecutive time windows when each planet gear 415.g passes within sensing range of the second vibration sensor 110.2; based on this second series of time windows, determining a second group of respective gear data bins 815(2).X.t which each includes vibration sensor data for only the one specific planet gear 415.X.

(4) Determine via the hardware processor 315 that a first data bin 815(1).X.1 occurs over during first time interval t; and that a second data bin 815(2).X.2 occurs over during second time interval t+1, where t+1 is immediately successive to t.

(5) Concatenate via the hardware processor the first data bin 815(1).X.1 and the second data bin 815(2).X.2, so that the hardware processor 315 establishes vibration profile 820.X for the planet gear 415.X.

Repeating steps (1) through (5) above for multiple time intervals, and for multiple planet gears 415.g, results in time-extended vibration profiles 820 for each of the planet gears 415.g.

Rotary Element Sensing/Monitoring for Other Mechanical Systems

Embodiments of the present system and method described above entail using multiple vibration sensors 110 to efficiently detect vibrations from multiple rotating components, such as multiple planet gears 115, which revolve within an enclosure 210 such as a gearbox. However, the multiple sensors 105 and the methods 800, 900, 1000 disclosed herein are also applicable, with suitable modifications to other rotary mechanical elements with multiple component, with each component part subject to a shared rotation about an axis, where each such component may benefit from or require real-time sensing or detection. Such mechanical parts may include for example and without limitation blades (in an engine, turbine, or compressor) or a chain around one or more gears or crank shafts.

While vibration sensors may be employed, additional or alternative embodiments of the present system and method may employ other kinds of sensors, such as multiple optical or video sensors, to monitor performance and operational aspects of such time-displaced components.

Figure 11:
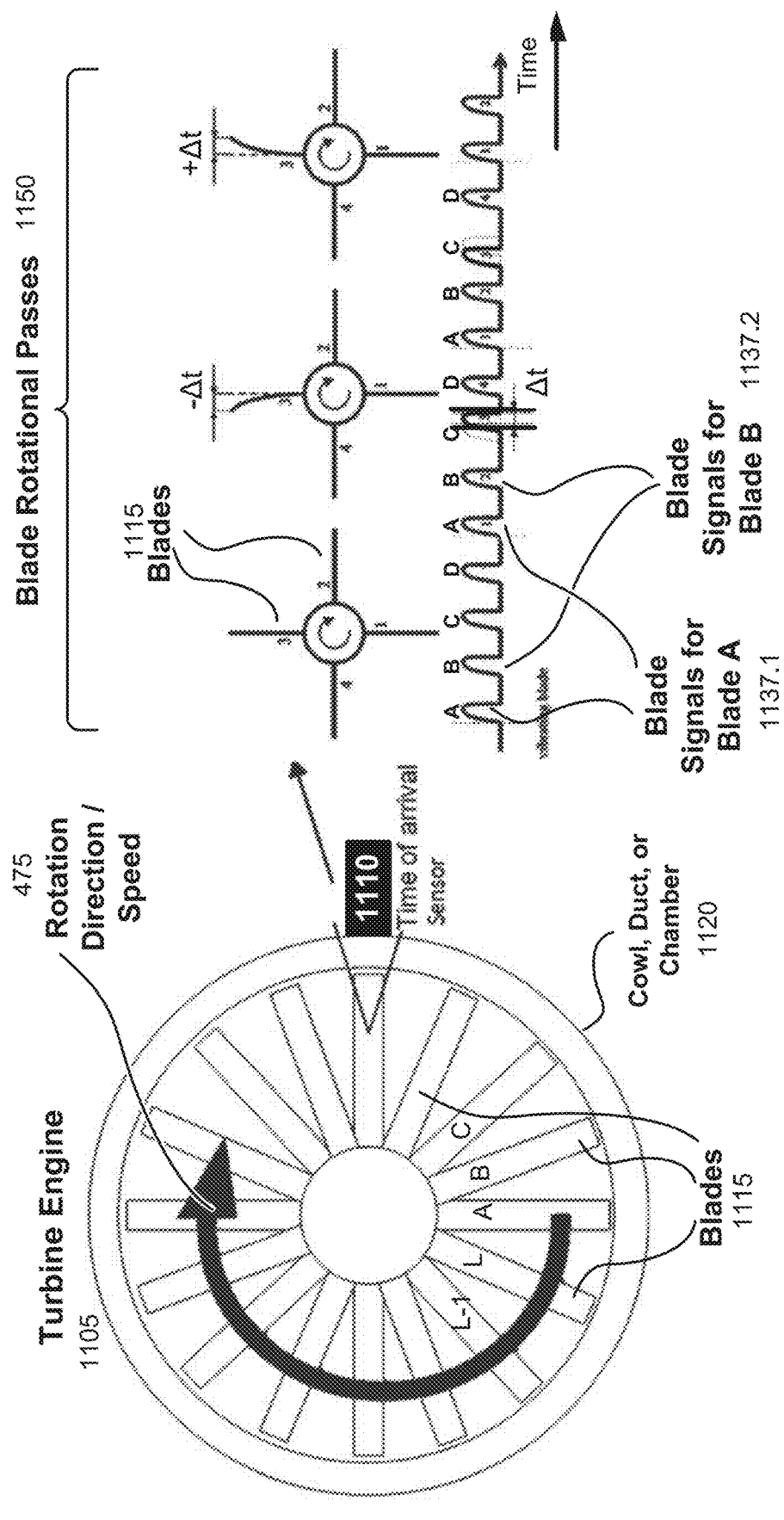
FIG. 11 illustrates a legacy system and method for monitoring of spinning blades in an engine such as a turbine or jet engine, where the monitoring is performed by a single sensor.

Legacy Engine or Turbine Blade Monitoring: By way of example, FIG. 11 illustrates elements 1100 of a legacy system and method 1100 for monitoring of spinning blades 1115 in an engine such as a turbine or jet engine 1105, where the monitoring is performed by a single sensor 1110.

In the legacy system 1100, each rotating blade 1115 passes a time-of-arrival sensor 1110 at a single sensing point once per rotation 475. The arrival time (t) of any one blade 1115.b is detected. Characteristics of the blade signal 1137 (for example, time changes in static deflection (As) or resonance modes) are calculated based on changes (Δt) in expected, synchronous blade arrival times over multiple blade passes 1150 (that is, multiple complete revolutions of the blades 1115).

Figure 12:
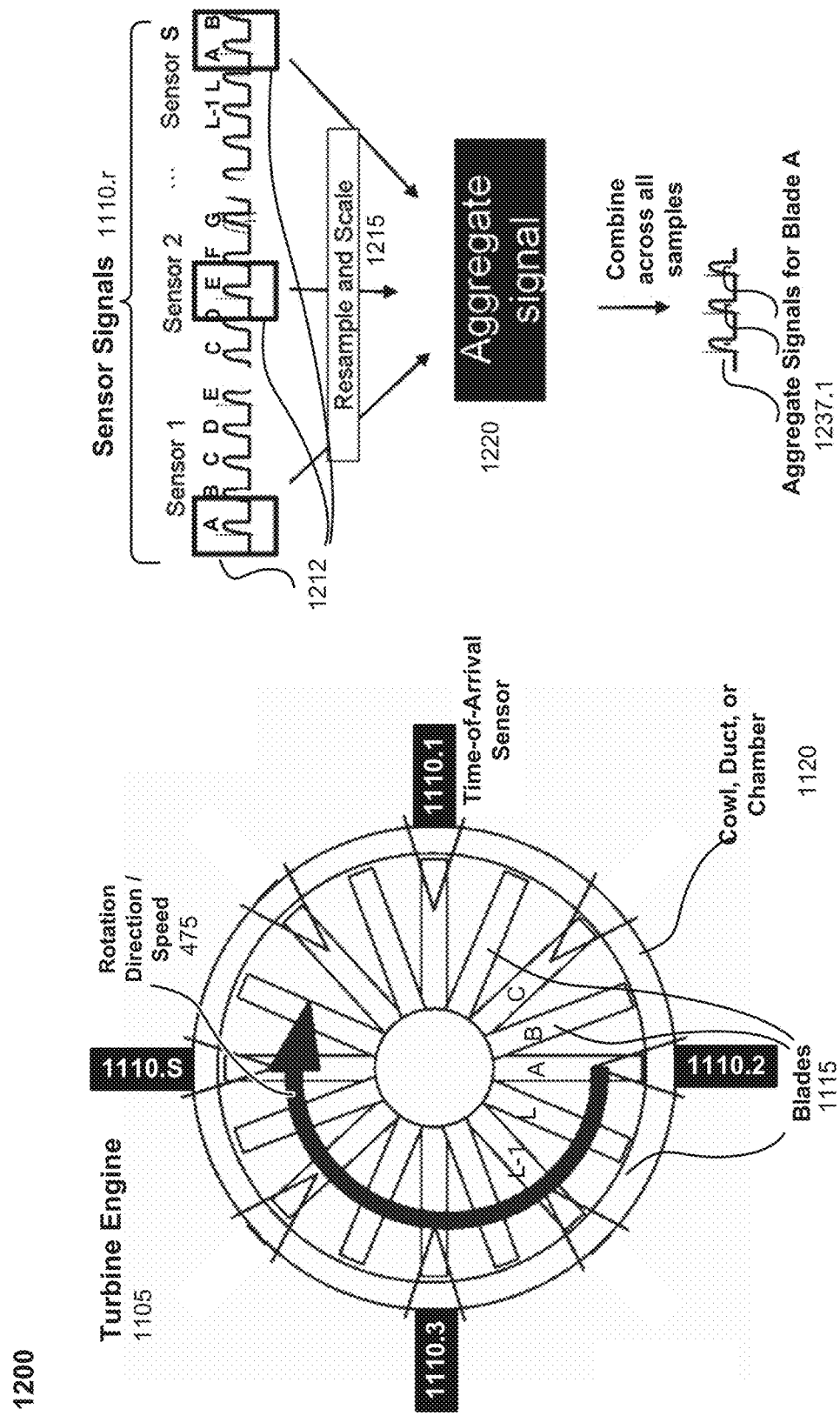
FIG. 12 illustrates elements according to the current system and method for monitoring of spinning blades in an engine, where the monitoring is performed by multiple sensors.

Engine or Turbine Blade Monitoring According to the Present System and Method: FIG. 12 illustrates exemplary system and method elements 1200 according to the current system and method for the monitoring of spinning blades 1115 in an engine 1105, where the monitoring is performed by multiple time of arrival sensors 1110.r.

In the exemplary system and method 1200, blade passes are sensed at multiple locations around the arc of rotation by multiple, spaced time-of-arrival sensors 1110.r. Signals from each sensor are:

(1) Time-windowed 1212 to isolate each blade 1115 as it passes by each sensor 1110.r, the time windows being based on an approximate range for an expected time of arrival for each blade;

(2) Processed to identify a specific time of arrival of each blade on each rotation;

(3) Resampled and scaled 1215 to account for sensor differences;

(4) Aggregated 1220 to create a combined signal 1225 for each blade across one or more complete revolutions.

Characteristics of the combined blade signal 1125 are then calculated. For example, changes in time of arrival of a given blade over an extended period of time may indicate a potential warping or the blade or a pending failure of the blade attachment.

VI. SUMMARY OF SOME EMBODIMENTS; ADDITIONAL EMBODIMENTS

In a mechanical system with rotating mechanical components (such as planet gears 415, blades 1115, propellers, or chains) which repeatedly traverse a circular path (780), typically but not necessary within a housing (210, the present system and method aggregates the vibration signals relating to the same gear, blade, or chain 415/1115 from multiple sensors 110/1110 placed at distributed fixed sensing points along the arc of motion of the rotating mechanical components. In an epicyclic gearbox 705, for one example, this allows the planet gears 415 to be "tracked" through the rotation, providing benefits for the speed in which a complete scan of each gear 415.g can be completed; this also increases the number of vibration 815/817 samples to reduce the influence of noise in the signal average and providing a consistent load path for the transmission of planet bearing vibration.

Components with spatial translations other than rotation: While the present system and method has been described with respect to rotating elements, other mechanical systems with dynamic variations in the placement of vibration components along some path 475 may benefit from similar application of multiple sensors along a known, repeated path of motion (that is, dynamically, time-varying changes of location of the components relative to the mechanical system as a unit).

For example, a mechanical system may have vibrating components 415/1115 (which may vibrate for example due to a localized rotation or oscillation of the element itself), where the component spatially translates (that is, changes position) along a linear path within the structure of the mechanical system, or along only an arc (rather than a full circle), or along an elliptical path. Other dynamic paths 475 of spatial translation or component displacement within the mechanical system may be envisioned as well.

Suitably distributed placement of multiple sensors 110.s along the path 475 of the component's dynamic displacement may be supported by the methods 800/900/1000/1200 disclosed herein, and other methods disclosed herein, to enable more detailed, more efficient monitoring of vibrations, locations, or other selected, time-variable operational properties of the dynamically moving components. Such methods will typically include at least:

(i) data time-windowing to identify/select data for a common element from different sensors;

(ii) aggregation of data from different sensors for a particular common, dynamically moving element; and (iii) time averaging of data from a same sensor and/or multiple sensors (as sensed during analogous time windows from different times) for the common, dynamically moving element. The methods may also include resampling of data to reduce data density, and rescaling of data from different sensors to normalize sensor data from different sensors. As above, normalization may be achieved by, for example and without limitation, software processing or adjusting gain on a signal.

Monitoring of continuous components: In an alternative embodiment, the present system and method, employing multiple sensors, may be used to provide improved health monitoring for a continuous component which is subject to spatial translation within a larger system. For example, multiple cameras or optical sensors may monitor the condition(s) of portions of a rapidly moving fan belt or chain (which may in turn move or be moved by multiple stationary gears). Real-time "snap shot" sensing of a fan belt or chain may be employed to maintain a continuous monitor of the entire condition of the fan belt or chain.

The methods disclosed herein thereby reduce the number of revolutions (or other path traversals) required to build up an accurate picture of component health for dynamically moving components. For example, in a planetary gear system 705, increasing the number of sensing locations at which planet gears 415 are tracked around the gearbox 210, fewer revolutions are required to obtain a complete vibration signal for each planet gear 415 (as opposed to systems with a single sensor).

Non-transportation systems: While the present system and method has been described herein with respect to vibration monitoring of rotary elements of a vehicle, many other mechanical and electron mechanical systems employ rotary gear systems and other rotary functional elements as well. For example, wind turbines and other automatic gearboxes have rotary mechanical components including planetary gear systems and blades. All such systems may also benefit from vibration monitoring via the present system and method.

VII. CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope of the disclosure. Therefore, it is to be understood that, within the scope of the appended claims, the disclosure may be practiced other than as specifically described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such as, for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section (and not the Summary and Abstract sections) is primarily intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for obtaining mechanical state/property (MSP) data for a plurality of mechanical elements, each mechanical element (i) representing an individual rotating component and (ii) being engaged in a plurality of periodic rotations within a mechanical system, the method comprising:

generating, via a respective sensor of a plurality of MSP sensors, a respective time-continuous MSP sensor signal to be received at a processor, the respective time-continuous MSP sensor signal being representative of a plurality of periodic rotations of a respective one of the plurality of mechanical elements when the respective element rotates within a plurality of corresponding consecutive time windows;

wherein the plurality of periodic rotations are sensed via the plurality of MSP sensors being attached along a surface of each mechanical element, the plurality of MSP sensors being spaced apart from each other along a sensing path of the plurality of periodic rotations of each mechanical element;

for a first time-continuous mechanical data signal being a first respective time-continuous MSP signal from a first MSP sensor of the plurality of MSP sensors:
determining, via the processor, a first series of respective consecutive time windows when each respective mechanical element passes within a sensing range of the first MSP sensor;
determining a respective first plurality of time-separated gear data bins, each first time-separated gear data bin having vibration data associated with a plurality of periodic rotations of a respective one of the plurality of mechanical elements within the first series of respective consecutive time windows;

for a second time-continuous vibration signal being a second respective time-continuous MSP signal from a second MSP sensor of the plurality of MSP sensors:
determining, via the processor, a second series of respective consecutive time windows when each respective mechanical element passes within a sensing range of the second MSP sensor;
determining a respective second plurality of time-separated gear data bins each second time-separated gear data bin having vibration data associated with a plurality of periodic rotations of a respective one of the plurality of mechanical elements within the second series of respective consecutive time windows;

determining via the processor that a first gear data bin from the first plurality of time-separated gear data bins occurs over a first time interval t;
determining via the processor that a second gear data bin from the second plurality of time-separated gear data bins occurs over a second time interval t+1, wherein the second time interval is successive to the first time interval t; and analyzing, via the processor, the vibration data from the first gear data bin and the second gear data bin, the analyzing generating a consolidated performance profile for each mechanical element, each performance profile (i) being generated by combining each of the first series of respective consecutive time windows and the second series of respective consecutive time windows that correspond to their respective mechanical element and (ii) containing data associated only with its respective mechanical element.

2. A method for obtaining mechanical state/property data for a plurality of mechanical elements engaged in a plurality of periodic rotations within a mechanical system comprising:
repeating the method of claim 1 for a plurality of additional MSP sensors of the plurality of MSP sensors, wherein a first element-specific mechanical state/property profile for the one respective specific mechanical element includes all of a plurality of MSP data for the one respective specific mechanical element from all of the MSP sensors of the plurality of MSP sensors.

3. A method for obtaining mechanical state/property data for a plurality of mechanical elements engaged in a plurality of periodic rotations within a mechanical system comprising performing the method of claim 1 for a second specific mechanical element which is different from the one respective specific mechanical element, wherein the method establishes a second element-specific mechanical state/property profile for the second specific mechanical element.

4. The method of claim 1, wherein each mechanical element is a planet gear, and the plurality of MSP sensors are a plurality of time-continuous vibration sensors configured to detect vibrations from each planet gear; and
wherein the method comprises generating at a microprocessor, from a plurality of vibration sensor data obtained from the plurality of vibration sensors, a vibration profile for a specific planet gear.

5. A method for obtaining mechanical state/property data for a plurality of mechanical elements engaged in a plurality of periodic rotations within a mechanical system comprising:
repeating the method of claim 4 for additional vibration sensors of the plurality of time-continuous vibration sensors, wherein the vibration profile for the specific planet gear of a plurality of planet gears includes a plurality of vibration data for the specific planet gear of the plurality of planet gears from all the vibration sensors of the plurality of vibration sensors.

6. A method for obtaining mechanical state/property data for a plurality of mechanical elements engaged in a plurality of periodic rotations within a mechanical system comprising:
performing the method of claim 5 for a second specific planet gear of the plurality of planet gears being different from the specific planet gear of the plurality of planet gears, wherein the processor establishes a second gear-specific vibration profile for the second specific planet gear.

7. The method of claim 6, further comprising applying teeth-specific time windows to obtain vibration data for a specific tooth of the specific planet gear of the plurality of planet gears.

8. A method for obtaining vibration data for a plurality of rotating mechanical elements, each mechanical element (i) representing an individual rotating component and (ii) being engaged in a plurality of periodic rotations within a mechanical system, the method comprising:

generating, via a respective vibration sensor of a plurality of time-continuous vibration sensors, a respective plurality of time-continuous vibration sensor signals to be received at a processor, each respective time-continuous vibration sensor signal being representative of the plurality of periodic rotations of a respective one of the plurality of mechanical elements when the respective element rotates within a plurality of corresponding time periods;

wherein the plurality of time-continuous vibration sensors are attached along a surface of each mechanical element, the plurality of time-continuous vibration sensors being spaced apart from each other along a path of the plurality of periodic rotations of each mechanical element;

applying, via the processor, a plurality of respective synchronous time windows to each of the time-continuous vibration sensor signals to identify respective sets of associated vibration data bins for each respective rotating mechanical component, each associated vibration data bin having vibration data associated with a plurality of periodic rotations of a respective one of the plurality of mechanical elements during a corresponding synchronous time window of the plurality of respective synchronous time windows; and analyzing, via the processor, the vibration data from each of the plurality of time-successive data bins, the analyzing generating a consolidated performance profile for each mechanical element, each performance profile (i) being generated by combining each of the plurality of corresponding time periods corresponding to all of the time-continuous vibration sensor signals that are associated with their respective mechanical element and (ii) containing data associated only with its respective mechanical element.

9. The method of claim 8, wherein:

The plurality of respective synchronous time windows are a set of sensor-specific time windows, each time window of the plurality of respective synchronous time windows spanning a sensing period of time when a single mechanical component is within a sensing range of a single vibration sensor;

each synchronous time window of the set of sensor-specific time windows being associated with a different sensor; and each respective synchronous time window of the plurality of respective synchronous time windows occurs at a plurality of different specific times;

wherein each vibration sensor of the plurality of time-continuous vibration sensors detects successive vibration data for a single designated mechanical component of the plurality of rotating mechanical components common to each synchronous time window of the plurality of respective synchronous time windows during its associated time window of the set of sensor-specific time windows.

10. The method of claim 9, further comprising calculating the plurality of respective synchronous time windows as a function of a location of each vibration sensor of the plurality of time-continuous vibration sensors, a rotation speed of each single designated mechanical component of the plurality of rotating mechanical components common to each respective synchronous time window of the plurality of respective synchronous time windows, and a geometry and spatial arrangement of mechanical components.

11. The method of claim 8, further comprising resampling the respective sets of associated vibration data bins over a plurality of rotations of each single designated mechanical component of the plurality of rotating mechanical components common to each respective synchronous time window of the plurality of respective synchronous time windows.

12. The method of claim 11, further comprising averaging the resampled vibration data bins obtained from a single sensor across multiple rotations of each single designated mechanical component of the plurality of rotating mechanical components common to each respective synchronous time window of the plurality of respective synchronous time windows over multiple time periods to obtain a time-averaged vibration profile for each respective mechanical component of plurality of rotating components.

13. The method of claim 11, further comprising scaling the respective sets of associated vibration data bins by a sensor-specific factor, wherein vibration data from each vibration sensor of the plurality of time-continuous vibration sensors is normalized in relation to other time-continuous vibration sensors of the plurality of time-continuous vibration sensors.

14. The method of claim 8, wherein each single designated mechanical component common to each synchronous time window is a planet gear, and the plurality of time-continuous vibration sensors are configured to detect vibrations from each planet gear; and wherein the method comprises generating at the processor a vibration profile for each planet gear.

15. The method of claim 14, further comprising applying teeth-specific time windows to obtain vibration data for a plurality of specific teeth of each specific planet gear.

16. A method for obtaining performance data for a plurality of mechanical elements, each element (i) representing an individual rotating component and (ii) being engaged in a plurality of periodic rotations of a known speed within a mechanical system, the method comprising:

receiving, via a processor, a plurality of vibration data signals being sensed by a plurality of sensors attached along a surface of each mechanical element, each vibration data signal being representative of the plurality of periodic rotations of a respective one of the plurality of mechanical elements when the respective element rotates within a plurality of corresponding time periods;

generating, via the processor, a plurality of time-successive data bins, each bin having vibration data associated with a plurality of periodic rotations of a respective one of the plurality of mechanical elements during a corresponding time period of the plurality of corresponding time periods; and analyzing, via the processor, the vibration data from each of the plurality of time-successive data bins, the analyzing generating a consolidated performance profile for each mechanical element, each performance profile (i) being generated by combining the plurality of corresponding time periods corresponding to all of the time-continuous vibration sensor signals sensed by each sensor of the plurality of sensors that are associated with their respective mechanical element and (ii) containing data associated only with its respective mechanical element.

17. The method of claim 16, further comprising resampling the vibration data from each of the plurality time of-successive data bins and averaging the resampled vibration data to obtain a time-averaged performance profile for each respective mechanical element.

18. The method of claim 16, further comprising scaling vibration data from each of the plurality of time-successive data bins by a sensor-specific factor.

19. The method of claim 16, wherein the plurality of mechanical elements are a plurality of planet gears, each planet gear comprising a plurality of teeth on an outer circumference of the planet gear.

20. The method of claim 19, further comprising receiving, via the processor, a plurality of tooth-specific time-successive data bins, each data bin having content associated with a corresponding time period within which each tooth of the plurality of teeth of the respective element rotates.

* * * * *